(12) United States Patent (10) Patent No.: US 12,377,749 B2
Goswami et al. (45) Date of Patent: Aug. 5, 2025

(54) COORDINATING VEHICLE ACCESS TO POWER DISPENSERS AT A CHARGING STATION

(71) Applicant: Rivian IP Holdings, LLC, Plymouth, MI (US)

(72) Inventors: Shrikant Goswami, Greensboro, NC (US); Marlene Mendoza, Novi, MI (US); Sylviane Mayer, Saline, MI (US); Gerald Cabrera, Winnetka, CA (US); Daniel Kung, Irvine, CA (US); Ethan Snyder, Laguna Niguel, CA (US); Brent Wooldridge, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 243 days.

(21) Appl. No.: 17/882,523

(22) Filed: Aug. 5, 2022

(65) Prior Publication Data

US 2024/0042888 A1 Feb. 8, 2024

(51) Int. Cl.
*B60L 53/66* (2019.01)
*B60L 53/65* (2019.01)
*B60L 58/12* (2019.01)
*H02J 7/00* (2006.01)

(52) U.S. Cl.
CPC ............. *B60L 53/66* (2019.02); *B60L 53/65* (2019.02); *B60L 58/12* (2019.02); *H02J 7/00032* (2020.01); *H02J 7/0013* (2013.01); *H02J 7/0048* (2020.01)

(58) Field of Classification Search
CPC .................................. B60L 53/66; B60L 58/12
See application file for complete search history.

(56) References Cited

U.S. PATENT DOCUMENTS

| | | | |
|---|---|---|---|
| 9,984,520 B1* | 5/2018 | Heller | H04W 4/80 |
| 2013/0110296 A1* | 5/2013 | Khoo | B60L 53/665 |
| | | | 700/286 |
| 2014/0214459 A1* | 7/2014 | Ryder | B60L 53/63 |
| | | | 705/5 |
| 2017/0297443 A1* | 10/2017 | You | H01R 13/6395 |
| 2019/0016331 A1* | 1/2019 | Carlson | G05D 1/0088 |
| 2019/0366851 A1* | 12/2019 | Moy | H02J 7/0013 |
| 2021/0086651 A1* | 3/2021 | Maeda | B60L 53/66 |
| 2022/0153152 A1* | 5/2022 | Pancutt | B60L 53/16 |

(Continued)

*Primary Examiner* — Jess Whittington
(74) *Attorney, Agent, or Firm* — BAKERHOSTETLER

(57) ABSTRACT

Particular embodiments may provide a method for facilitating access to power dispensers at a charging station by a server. The server receives a request to charge an electric vehicle (EV) at a charging station that has one or more power dispensers. Then, the server identifies a target EV to request disconnection of the power dispenser connected to the target EV based on an assessment of the EVs connected to the power dispensers. The server facilitates communication with a device associated with the user of the target EV, wherein the communication includes transmission of a notification comprising a request to disconnect the power dispenser connected to the target EV. Based on a response indicating acceptance of the request to disconnect the power dispenser, the server transmits signals to stop the power dispenser from charging the target EV and to unlock a charge port of the target EV.

20 Claims, 14 Drawing Sheets

(56) References Cited

U.S. PATENT DOCUMENTS

| | | | |
|---|---|---|---|
| 2022/0194236 A1* | 6/2022 | Whiting | B60L 53/64 |
| 2023/0001817 A1* | 1/2023 | Nassar | B60L 53/67 |
| 2023/0177903 A1* | 6/2023 | Yu | B60L 53/57 |
| | | | 705/5 |
| 2023/0242156 A1* | 8/2023 | Lankes | G05B 19/4155 |
| | | | 701/22 |
| 2023/0382262 A1* | 11/2023 | Ha | B60L 53/665 |

* cited by examiner

COORDINATING VEHICLE ACCESS TO POWER DISPENSERS AT A CHARGING STATION

INTRODUCTION

With the increase of electric vehicles (EVs) on our roads, demand for EV charging grows. Although charging stations provide a useful service to EV owners, there are too few such stations and they are frequently full with long wait times. The shortage in charging stations and available power dispensers forces EV owners that desire to charge at a charging station to either wait for a power dispenser to become available or search for another charging station.

BRIEF SUMMARY

In some instances, a charging station may have power dispensers that could actually be transferred to later arriving individuals. For example, an EV is fully charged, but its owner has not disconnected the power dispenser. Further, it may not be practical or desirable for later arriving EV owners to forcefully gain access to those dispensers, nor is there a mechanism for a later arriving user to contact users with EVs already connected to the power dispenser.

The present disclosure introduces a method to provide EV owners with the ability to request access to power dispensers at a charging station to address the scenario where the dispensers may all be occupied when the owner arrives at the charging station. After the request has been submitted, the method may then allow the owner of one of the EVs currently connected to a power dispenser to accept the request and allow the first owner to gain access to the power dispenser. The method may start with the EV owner that desires a power dispenser submitting a request to, e.g., a server for access to one of the power dispensers. The server may retrieve various information on the EVs connected to the power dispensers in order to select one in particular. The server may then forward the access request to the selected EV's owner to facilitate communication between the two EV owners. The selected EV's owner may then respond to the forwarded request to accept the access request. Once the server confirms that the selected EV's owner has accepted the access request, the server may transmit signals to the relevant power dispenser and the selected EV so that the power dispenser may be disconnected and transferred to the owner that had requested access.

In various embodiments, a method by a server computing device includes receiving, from a first device associated with a first user, a request to charge a first electric vehicle (EV) at a charging station, the charging station including one or more power dispensers and associated charging connectors for delivering power to EVs, where the first user is associated with the first EV. In various embodiments, after receiving the request, the method further includes identifying, based on an assessment of one or more EVs connected to the one or more power dispensers at the charging station, a target EV to request disconnection of a target power dispenser connected to the target EV. In various embodiments, after identifying the target EV, the method further includes facilitating communication with a second device associated with a second user, where the second user is associated with the target EV, and where the communication includes transmission of a notification comprising a request to disconnect the power dispenser connected to the target EV. In various embodiments, after facilitating communication, based on a response from the second device indicating acceptance of the request to disconnect the power dispenser, the method further includes transmitting a first signal that causes the target power dispenser to stop charging the target EV, and transmitting a second signal that causes the target EV to unlock a charge port of the target EV so that the charging connector associated with the target power dispenser connected to the target EV may be disconnected from the target EV.

Optionally, upon receiving the response accepting the request, the method further includes transmitting an access key to the first device, where the access key causes the target EV to unlock the charge port when the first device is within a threshold distance from the target EV.

Optionally, upon receiving the response accepting the request, the method further includes transmitting a notification to the first device comprising an indication that the request has been accepted, an indication identifying the target power dispenser, and information on whether the target EV will need to be disconnected from the target power dispenser.

Optionally, upon receiving the response accepting the request, the method further includes transmitting a third signal to autonomously disconnect the target power dispenser connected to the target EV.

Optionally, the method further includes transmitting a fourth signal to the target EV to autonomously relocate the target EV away from the target power dispenser.

Optionally, after receiving the response from the second device, the method further includes adjusting a social rating associated with the second user based on the response.

Optionally, the social rating is adjusted by an amount based on a charge level of the target EV when the response was received from the second device.

Optionally, the notification transmitted to the second device further includes information on a charge level of the first EV and a charge level of the target EV.

Optionally, the assessment of the one or more EVs is based on a charge level of each of the one or more EVs.

Optionally, the assessment of the one or more EVs is based on an intended destination of each of the one or more EVs.

Optionally, the assessment of the one or more EVs includes a comparison of a second EV with a third EV, where the target EV is one of the second EV and the third EV.

Optionally, upon receiving the request to charge at the charging station from the first user, the method further includes adding the first user to a queue of users that have submitted requests to charge at the charging station.

Optionally, the queue ranks the users based on an urgency of charge of the respective EVs, where higher ranked users are notified earlier than lower ranked users that their request to charge at the charging station has been accepted Optionally, the method further includes facilitating a transaction to transfer an incentive fee between a first bank account associated with the first user and a second bank account associated with the second user.

Optionally, an amount for the incentive fee is determined using a machine learning model.

Optionally, an amount for the incentive fee is based on a charge level of the target EV.

Optionally, upon receiving the request to charge at the charging station from the first device, the method further includes determining that the first device is within a predetermined distance from the charging station.

Optionally, the charging station is selected from among a plurality of charging stations that are a same distance from the first device In various embodiments, a non-transitory computer-readable medium comprising instructions that, when executed by one or more processors of one or more computing devices, cause the one or more processors to receive, from a first device associated with a first user, a request to charge a first electric vehicle (EV) at a charging station, the charging station comprising one or more power dispensers and associated charging connectors for delivering power to EVs, wherein the first user is associated with the first EV. In various embodiments, after receiving the request, the instructions further cause the processors to identify, based on an assessment of one or more EVs connected to the one or more power dispensers at the charging station, a target EV to request disconnection of a target power dispenser connected to the target EV. In various embodiments, after identifying the target EV, the instructions further cause the processors to facilitate communication with a second device associated with a second user, where the second user is associated with the target EV, and where the communication includes transmission of a notification comprising a request to disconnect the power dispenser connected to the target EV. In various embodiments, after facilitating communication, based on a response from the second device indicating acceptance of the request to disconnect the power dispenser, the instructions further cause the processors to transmit a first signal that causes the target power dispenser to stop charging the target EV, and transmit a second signal that causes the target EV to unlock a charge port of the target EV so that the charging connector associated with the target power dispenser connected to the target EV may be disconnected from the target EV.

In various embodiments, a system including one or more computing devices, including one or more non-transitory computer-readable storage media including instructions, and one or more processors coupled to the one or more storage media, the one or more processors configured to execute the instructions to receive, from a first device associated with a first user, a request to charge a first electric vehicle (EV) at a charging station, the charging station comprising one or more power dispensers and associated charging connectors for delivering power to EVs, wherein the first user is associated with the first EV. In various embodiments, after receiving the request, the instructions further cause the processors to identify, based on an assessment of one or more EVs connected to the one or more power dispensers at the charging station, a target EV to request disconnection of a target power dispenser connected to the target EV. In various embodiments, after identifying the target EV, the instructions further cause the processors to facilitate communication with a second device associated with a second user, where the second user is associated with the target EV, and where the communication includes transmission of a notification comprising a request to disconnect the power dispenser connected to the target EV. In various embodiments, after facilitating communication, based on a response from the second device indicating acceptance of the request to disconnect the power dispenser, the instructions further cause the processors to transmit a first signal that causes the target power dispenser to stop charging the target EV, and transmit a second signal that causes the target EV to unlock a charge port of the target EV so that the charging connector associated with the target power dispenser connected to the target EV may be disconnected from the target EV.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, may be claimed in another claim category, e.g., system, as well. The dependencies or references back in the attached claims are chosen for formal reasons only. However any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

DETAILED DESCRIPTION

Figure 1:
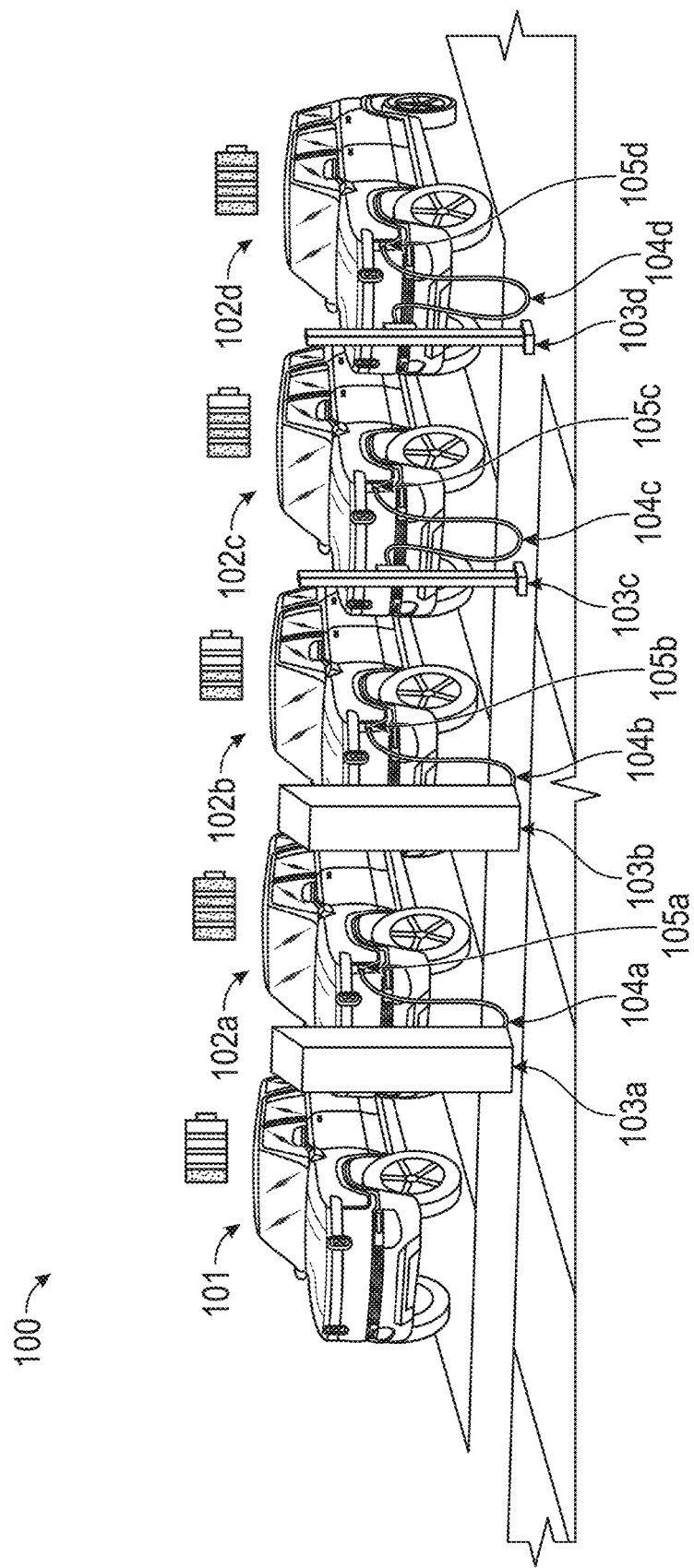
FIG. 1 illustrates an exemplary scenario where power dispensers at a charging station are occupied when an EV needs to charge.

FIG. 1 illustrates an exemplary scenario 100 that may be addressed by the present disclosure. In the illustrated scenario, a charging station includes EVs connected to power dispensers to re-charge batteries. In this example scenario, the charging station includes four power dispensers 103a-103d associated with various parking spaces, where each dispenser is connected to one of four EVs 102a-102d, along with four charging connectors 105a-105d linked to the power dispensers 103a-103d via charging cables 104a-104d. In other words, the charging station may not have any available power dispensers for a new EV, for example EV 101, to connect.

Each of the four EVs 102a-102d connected to the power dispensers may be at various levels of charge, with some such as 102a and 102d at or close to a full charge, and others, such as 102b and 102c, at less than full charges. EVs such as 102a and 102d in the exemplary scenario may no longer need to be connected to a power dispenser, but remain connected even with full charges or close to full charges for any number of reasons, such as the EVs' owners not being immediately available to disconnect their EV from the power dispenser. Further, EVs 102b and 102c may no longer need to be connected because they are sufficiently charged for their next journey, but again the EV's owners have not disconnected their vehicles. Thus, when EV 101 arrives at the charging station and urgently needs to connect to a power dispenser, EV 101 does not have access to a power dispenser. Further, the owner of EV 101 may have no method of requesting access to a power dispenser, nor be able to disconnect a power dispenser of one of the other EVs 102a-102d. The present disclosure advantageously provides the owner of EV 101 with an ability to request access to one of the power dispensers 103a-103d. Subsequently, the method may allow the owner of EV 102a-102d to respond to the request and choose whether to accept the request to access the power dispenser.

Figure 2:
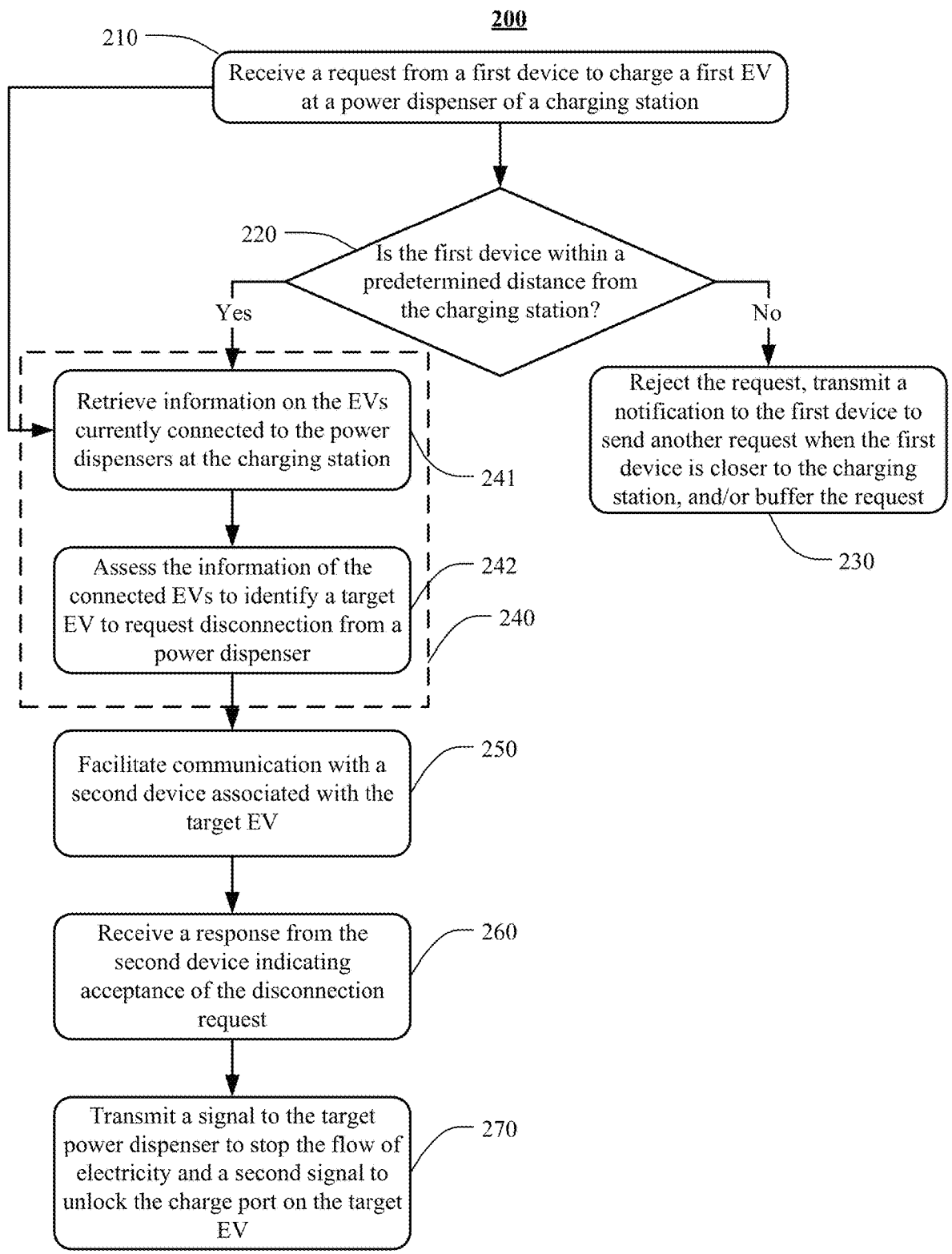
FIG. 2 is a flowchart illustrating steps of a method for processing a request for access to a power dispenser at a charging station.

FIG. 2 depicts a flowchart illustrating steps in a method 200 for processing a request for access to a power dispenser at a charging station. In some embodiments, method 200 is performed by a server computing device within a networked environment. In other embodiments, method 200 is not performed by a server. For illustrative purposes, method 200 is described below with respect to a server implementing the method, but it should be appreciated that other embodiments may implement the method in other ways. Additionally, in various embodiments, method 200 may be applied to address the example scenario of FIG. 1 where all of the power dispensers at a charging station are occupied but another EV requires access to a power dispenser. A power dispenser may be occupied in different manners in different embodiments, such as being connected to an EV or being reserved for another EV.

Method 200 starts at step 210, when the server receives a request from a first device associated with a first user for access to a power dispenser in order to charge a first EV at a charging station. In accordance with examples described herein, the device may include a mobile application, provided by an entity associated with the charging station and the first EV, that is installed and executing on the device for enabling wireless communication between the server and the first EV. The charging station may include power dispensers, such as dispensers 103a-103d in FIG. 1, with associated charging connectors for delivering power to EVs connected to the dispensers. The first user may be any individual that is associated with the first EV, such as an individual that is registered as the owner of the first EV, or an individual that has some relation to the owner of the first EV and is legally allowed to drive the first EV. The server may validate the status of the first user which submitted the request by using stored information that is accessible to the server. For example, EV or user profiles may be stored on the server that identifies all individuals that have an association with a given EV. Alternatively, the server may retreive the relevant information from a partner service, which may be maintained by entities such as a motor vehicle association or a vehicle insurance company. In various embodiments, the first user may be an individual that is also within some proximity of the first EV. This may help to ensure that the first user sending the request is associated with the first EV and that the request was not initiated unintentionally when the first user was far away from the first EV. In such embodiments, the proximity of the first user may be verified by analyzing the GPS location of the first device, which is associated with the first user, when the request was submitted. The GPS location of the first device being within some predetermined proximity of the first EV may indicate that the first user is associated with the first EV. Additionally, the first device that actually sent the request may be any appropriate electronic device capable of submitting such requests, as well as receiving notifications in order to support subsequent steps, such as a mobile device or a component like an electronic control unit (ECU) that is on the first EV itself. In other words, the first device that submits the request for access to a power dispenser may or may not be separate from the first EV. Additionally, the first device may also be configured to automatically generate and submit a request on behalf of the first user once the first device detects that some parameter has been satisfied. For example, the first device may be configured to continuously monitor the charge level of the first EV, and once the charge level falls below some threshold, a request is automatically generated and submitted to the server.

After receiving the request from the first device for access to a power dispenser in order to charge the first EV at the charging station, the server may identify a charging station for the first user, which may be the closest charging station to the first user when the request was submitted, e.g., the closest charging station to the GPS location of the first device when the request was submitted. Alternatively, if there are multiple charging stations that are equidistant from the first device, the server may select the charging station randomly or based on some additional factors, such as the availability of the charging station or the maximum power output available at the charging station. Equidistant charging stations may refer to charging stations that are determined to be equal in some measure. For example, equidistant charging stations may mean charging stations that are the same approximate distance from the first user, or it may mean charging stations that would take the first user approximately an equal amount of time to reach from their current position, although other definitions may be appropriate. The additional factors may comprise different elements in various embodiments, and may be considered in cases where there are equidistant charging stations from the first device as well as in cases where there aren't equidistant charging stations in order to identify the best charging station that the first user should proceed to. For example, if two charging stations are similar distances from the first device but one of the charging stations that is slightly closer is busier while the other charging station that is slightly farther is less busy, the server may elect the latter charging station.

In various embodiments, the first user may be allowed to submit requests before they have actually arrived at a charging station. However, to prevent users from submitting requests when they are still very far from the charging station and end up essentially reserving power dispensers for themselves for extended periods of time, the server may not accept and process a request if the request was not submitted within some proximity to a charging station. Accordingly, at optional step 220, the server may determine whether the first device, which represents the position of the first user, is within a predetermined distance or within a predetermined travel time from the charging station when the request was submitted. The server may make this determination in any appropriate manner, such as calculating a distance from the GPS location of the first device to some virtual point at the charging station and comparing the calculated distance with a threshold, defining a virtual perimeter around the charging station that includes some amount of area outside of the charging station and determining whether the GPS location of the first device is within the virtual perimeter, or calculating an estimated amount of time that a vehicle would take to arrive at the charging station from the first device's location. In cases where the first user submits a request after arriving at the charging station and realizing all the power dispensers are occupied, the server may then select that same charging station and process the request as the first user is within the predetermined distance from the charging station.

Step 220 may be an optional step in method 200 and not implemented in various embodiments. For example, various embodiments may want to allow users to submit requests while they are still relatively far away from the charging station. In such cases, there may not be a need for step 220 to determine whether a request was submitted within a predetermined distance to the charging station. Another example may be that various embodiments structure the server such that it is only able to receive requests from devices that have satisfied some precondition, such as executing a connection protocol with the charging station. In such cases, the connection protocol may have a limited effective radius of some predetermined distance from the charging station. Thus, a device may only be able to execute the connection protocol once it has entered the effective radius, or essentially, once the device is within the predetermined distance to the charging station. As a result, this may mean to the server that any requests it receives have been submitted by a device that is within the predetermined distance to the server, which is why step 220 would not be necessary. With step 220 being optional, various embodiments may proceed from step 210 directly to step 240.

If the server determines that the first device is not within the predetermined distance when the request was submitted, at step 230, the server may handle the request in any appropriate manner. For example, the server may automatically reject the request and transmit a notification with the rejection to the first device to alert the first user. Alternatively or additionally, the server may transmit a notification to advise the first user that they submitted a request when they were too far from the nearest charging station and that the first user should submit another request once they are closer to the charging station. Such a notification may include the location of the charging station so the first user may begin to proceed towards it and also an estimated time for when the first user should submit their next request. In some embodiments, the server buffers the request without immediately responding to the first user or processing the request, and subsequently, continuously queries the position of the first user through the GPS of the first device to determine when the first user arrives within the predetermined distance. Once the first user is within the predetermined distance, the server may automatically begin processing the request according to the remaining steps of method 200. Additionally, because step 230 is entirely dependent on step 220 where step 220 may be optional in various embodiments as described above, step 230 may also be optional where step 220 is optional as it would not be necessary to execute step 230 when the prerequisite step 220 is not implemented.

If the server determines that the first device is within the predetermined distance to the charging station when the request was sent or in embodiments without step 220, then at step 240, the server may proceed with identifying a target EV connected to one of the power dispensers to request disconnection of the power dispenser connected to the target EV. As an illustrative example, step 240 in method 200 comprises steps 241 and 242. At step 241, the server may retrieve information on the EVs that are connected to a power dispenser at the charging station. The information that is retrieved at this step may include any data that may aid in identifying a particular EV to request disconnection from the power dispenser, such as the charge level or state of charge of the connected EV, the intended destination of the connected EV (for example, if the connected EV's destination, as known from the EV's mapping system and identified from the server, is hundreds of miles away from the charging station, this information may help to determine that the user associated with this specific EV would likely not accept disconnection requests), the connected EV's associated users' past charging trends (for example, if the user associated with a connected EV has a history of always charging to at least 90% and the connected EV is currently only at 70%, this EV may not be the best choice for a target EV), social rating (a rating that reflects an EV user's behavior at charging stations, which may include their tendency to accept disconnection requests), a prior known association between the first user that submitted a request and the user associated with a connected EV (for example, the user associated with a connected EV had previously accepted a disconnection request from the first user, or a virtual key had been provided from either one of the users to the other), or any other information that may indicate a higher probability of the user associated with a particular connected EV accepting a request than the users for other connected EVs. This information may be retrieved from the power dispenser or a data store, with certain information like the charge level of the EV being retrieved from the power dispenser that the EV is connected to, while other information like the past charging trend of a connected EV's associated user may be retrieved from a data store, which may be any medium capable of storing data, such as but not limited to databases or key-value stores. When data is retrieved from a data store, the server may ensure the data is associated with the connected EV or the user associated with the connected EV by utilizing the identity of the EV that was provided when the EV connected to the power dispenser. When the EV first connects to the power dispenser, the EV may uniquely identify itself to the grid through the vehicle to grid (V2G) communication interface ISO 15118. Through this interface, the EV and the user associated with the EV may be identified, and data that is associated with the EV or user may be correctly identified.

After the server retrieves information on the EVs that are connected to a power dispenser at the charging station, at step 242, the server may conduct an assessment of the information of the EVs connected to the power dispensers in order to identify a target EV to request disconnection from the power dispenser. The assessment may be performed in various ways to evaluate the EVs connected to the power dispensers to identify the target EV. For example, the information retrieved at step 241 may be analyzed to assign points to the connected EVs, and the connected EV with the highest points after the assessment may be identified as the EV that is most likely to accept a request to disconnect from the power dispenser and thus the target EV. Specifically, and continuing with the example data from above, EVs with higher charge levels may be assigned more points than EVs with lower charge levels, EVs with intended destinations closer to the charging station may be assigned more points than EVs with intended destinations further away from the charging station, EVs with associated users that demonstrate more favorable charging station behavior trends may be assigned more points than those with associated users that demonstrate less favorable trends (using the above example, favorable may be defined as the charge level of the connected EV currently being at 85% with the associated user having a historical trend of always maintaining at least 80% charge on the EV), and EVs associated with users that have higher social ratings may be assigned more points than those associated with users with lower social ratings. Additionally, the EV eventually identified as the target EV may also be at any charge level, including a full charge.

For the assessment, it may be possible that multiple EVs connected to the power dispensers are identified as possible EVs to be the target EV. Using the previous example, it may be that more than one of the EVs are awarded the same number of points during the assessment and thus may both be the target EV. In such cases, the target EV may be identified by randomly selecting one of the EVs with the highest evaluations from the assessment. Alternatively, the target EV may also be identified through a second assessment, which may only include the EVs with the highest evaluations from the first assessment. This second assessment may also rely on a different evaluation standard than the first assessment. For example, while the first assessment may be based on the charge levels of the EVs connected to the power dispensers, the second assessment may be based on the intended destinations of the EVs. This process of evaluating the EVs with successive assessments may be executed repeatedly until a single EV is identified as the target EV. However, in order to prevent too many assessments from being conducted and the process of identifying the target EV taking too much time to complete, a limit on the number of assessments may be imposed, and once the limit is reached, the target EV may be forcefully identified, such as through a random selection. Alternatively, instead of relying on multiple assessments or random selection, the target EV may be identified to be more than one of the EVs with the highest evaluations from the initial assessment. In other words, the target EV may actually include multiple EVs connected to the power dispensers. As such, the subsequent steps may be executed with regards to each of the EVs that are identified as the target EV.

Assessing the information during step 242 may be implemented in any appropriate manner with regards to the assessment approach, but because analyzing some data may be more difficult than others (e.g. charge level vs. historical charging behavior), the implementations for some analyses may need to be more complex than others (e.g. simple algorithms vs. neural networks). Once the assessment of the data is completed, the EVs connected to the power dispensers may be compared with one another to identify the target EV from among the EVs connected to the power dispensers.

After the target EV has been identified, at step 250, the server may facilitate communication with a second device associated with a second user, where the second user is associated with the target EV and the second device, like the first device, is any electronic device that is capable of sending and receiving notifications. Such devices may include mobile devices as well as components on the target EV itself. As such, the second device may or may not be separate from the target EV. In various embodiments, the second device may also include a plurality of devices. In order to effectively facilitate communication between the first and second user and increase the likelihood that the first user gets a response to their request, the server may transmit the notification to multiple devices, such as a mobile device of the second user and a component of the target EV itself. Subsequently, the second user may only need to submit their response through one of the devices to respond to the request.

The communication may include, inter alia, transmission of a notification comprising a request to disconnect the power dispenser connected to the target EV. The notification that is transmitted to the second device may include various information that may aid in the second user determining whether to accept the request. For example, the notification may include information on the charge level of both the first EV, which is associated with the first user that submitted a request for access to a power dispenser, and the charge level of the target EV, which is associated with the second user of the second device. Additionally, the notification may also include the intended destination or the distance to an intended destination of the first EV that is retrieved from the first EV's mapping system and identified by the server. If the second user becomes aware that the first user submitted a request because their EV is low on charge and yet is still hundreds of miles from their intended destination, the second user may be more likely to accept the request. However, including this information in the notification may require the first user's explicit consent, as it may be private information. Further, in embodiments where the first user may submit requests before arriving at the charging station, the notification may also include information such as how far the first user is from the charging station, how much more time it will take the first user to arrive at the charging station, and/or the level of charge the target EV can reach before the first user arrives. If the second user knows that their EV is able to reach a specific charge level even if they accept the disconnection request because the requestor will not arrive for a while, it may increase the probability that they accept the request.

Once the notification has been transmitted to the second device associated with the second user, the second user may decide to accept the disconnection request, and thus at step 260, the server may receive a response from the second device indicating the second user's acceptance of the disconnection request. The response may also include an indication that the second user will personally disconnect the power dispenser connected to the target EV. This may advantageously allow the second user to ensure that they will disconnect the power dispenser. Accordingly, because there may be a delay between the time when the second user makes the indication as part of their response and the time when the second user actually disconnects the power dispenser from the target EV, the server may monitor the power dispenser and not proceed with any subsequent steps of method 200 until it determines that the power dispenser has indeed been disconnected. In various embodiments, to ensure that the second user follows through with the disconnection, the server may transmit reminders to the second device at set intervals after the response was received if the power dispenser remains connected to the target EV. In other words, if the second user indicated they would disconnect the power dispenser but then fails to act in some time period, the server may transmit reminders to the second user to remind them to disconnect the power dispenser. In other embodiments, the response from the second user may include an indication granting permission for whoever submitted the request, namely the first user, to disconnect the power dispenser connected to the target EV.

Additionally, the response may be able to take different formats. For example, the response may comprise a choice from a list of predetermined responses where each predetermined response corresponds to different actions for the server. Specifically, the list of choices may include a choice to accept the request and then have the second user disconnect the power dispenser, where this choice being selected results in the server monitoring the power dispenser and sending reminders to the second device as necessary. The list may include another choice to accept the request with an authorization for the first user to disconnect the power dispenser from the target EV, where this choice being selected would not require the server to monitor the power dispenser and send reminders. Another implementation may allow the second user to input a custom response to the request notification, such as typing "Sure, I will disconnect the power dispenser". In such implementations, for the server to understand the response, parse out any necessary information, and proceed appropriately may utilize additional components such as a natural language processing model to process the custom response from the second user.

Once the response indicating acceptance of the request to disconnect the power dispenser from the target EV has been received, at step 270, the server may transmit a signal to the power dispenser connected to the target EV, or the target power dispenser, that causes the power dispenser to stop charging the target EV by stopping the flow of electricity, and a second signal to the target EV to unlock the charge port of the target EV so that the charging connector associated with the target power dispenser may be disconnected from the target EV. Either the first or second user may then subsequently disconnect the power dispenser from the target EV. In some cases, even though the second user may have accepted the disconnection request, they may not want to grant permission for the first user to disconnect the power dispenser, but the second user themselves also may not be able to timely disconnect the power dispenser. In order to address this scenario, in various embodiments, the server may additionally transmit a third signal to the power dispenser in order to autonomously disconnect the power dispenser from the target EV. Further, because the second user may not be able to timely disconnect the power dispenser themselves, it may also be the case that the second user is not able to move the target EV away from the power dispenser in order for the first EV to then connect to the power dispenser. As such, the server may transmit a fourth signal to the target EV so as to cause the target EV to enter an autonomous driving mode and autonomously relocate the target EV away from the power dispenser to an available nearby parking space or an area that has been designated by the second user. In embodiments that support autonomous disconnection of the power dispenser and autonomous relocation of the target EV, the response from the second user may further include an indication that authorizes the execution of the aforementioned autonomous processes. Due to the possibility of a delay between the time that the target EV is autonomously relocated and the time that the first user is able to connect the first EV to the power dispenser, the power dispenser may be reserved until the first user arrives at the power dispenser to prevent a third user from taking advantage of that delay and occupying the power dispenser. An additional notification may be sent to the first device to notify the first user that the power dispenser has been reserved for them.

In order to ensure a smooth transition of the power dispenser from the second user to the first user, the server may also provision a temporary and limited access virtual key to the first device that is associated with the first user. The virtual access key may be used to allow the first user to unlock the charge port of the target EV using the first device. Specifically, upon receiving the response from the second user indicating acceptance of the request, the server may provision and assign the virtual access key to the first device such that when the first user approaches and arrives within a threshold distance (such as 5 or 10 feet) from the target EV with the first device, wireless communication (e.g., Bluetooth Low Energy) is established between the first device and the target EV, unlocking the charge port of the target EV. Accordingly, the first user may then be able to safely disconnect the power dispenser by removing the charging connector from the target EV. Once the charging connector has been detected as being removed from the target EV, either via the server (e.g., the charging connector is detected in a holding area of the power dispenser) or via the target EV (e.g., no charging connector is detected in the charging port inlet), the server may facilitate removal of the temporary virtual access key from the first device. In various embodiments, the virtual access key may be the second signal, or at least a part of the second signal, that is transmitted from the server upon receiving the response indicating acceptance of the request to disconnect the power dispenser. In other words, after transmitting the first signal to the target power dispenser to stop charging the target EV, the server may transmit the virtual access key to the first device to indirectly unlock the charge port instead of a signal to the target EV to directly unlock the charge port.

In some embodiments, method 200 may skip 250 and 260 and proceed from step 240 to step 270. For example, the assessment of the EV data at step 242 may also incorporate special conditions that affect the flow of method 200, such as shortening the method and expediting the processing of a request. In some embodiments, the special condition may be directed to monitoring EVs for any that may be at a full charge while still being connected to a power dispenser. Because EVs that have reached full charge do not need to remain connected to the power dispenser, such EVs may be disconnected without necessarily needing to go through the same processing for EVs that have not reached a full charge. When the assessment identifies any such EVs as part of step 242, method 200 may proceed straight from assessing the EV information to identifying one of those EVs as the target EV and executing the disconnect operations associated with step 270. At the same time, the server may transmit a notification to the second device that the target EV will be disconnected as the target EV has already reached a full charge and a request for a power dispenser has been received. A separate notification may then be transmitted to the first device that the request was accepted. As a result, special conditions, which in this example was directed to EVs that had reached full charges, may allow for a first user's request to be accepted without needing to go through a second user associated with the target EV to get an active response accepting the first user's request.

Concurrently with or separately from transmitting signals and disconnecting the target EV, the server may transmit a notification to the first device associated with the first user with an indication that their request for access to a power dispenser has been accepted. The notification may also identify the power dispenser that was just disconnected so that the first user knows which dispenser to proceed to, as well as information on whether the target EV will need to be disconnected from the power dispenser. As mentioned above, the response from the second user accepting the request may include an indication granting permission for the first user to disconnect the power dispenser. In such cases, the power dispenser may have stopped charging and the charge port on the target EV may be unlocked, but the dispenser remains connected to the target EV, thus requiring the first user to first disconnect the power dispenser, something which may be indicated in the notification to the first user.

As part of method 200, the server may also support the first user, which submitted the request to the server, offering an incentive to the second user associated with the target EV in order to increase the chance that the second user accepts the request. For example, the first user may offer an incentive fee that may be transferred to the second user should the second user accept the request. The server may inform the second user of the incentive as part of facilitating communication with the second device at step 250, and subsequently, facilitating a transaction to transfer the incentive fee between a first bank account associated with the first user and a second bank account associated with the second user. Additionally, the second user may be given the ability to propose a different amount for the incentive fee which they would agree to for accepting the disconnection request. However, to prevent elongated discussions where the first and second users go back and forth in trying to agree on an incentive fee amount, the server may impose a limit on the number of counteroffers that may be proposed by each side. For example, the most stringent limitation may be that only one counteroffer is allowed, where the second user is able to propose a new amount and the subsequent acceptance or rejection of that offer by the first user determines whether the incentive fee is accepted and/or the disconnection request is accepted. As an example implementation, the offer may be included in the request from the first device received by the server at step 210. After the server identifies a target EV at step 242, the notification that is transmitted to the second device as part of step 250 may include an indication that the disconnection request comes with an incentive fee should the request be accepted. When the server receives the response indicating acceptance of the request at step 260, the server may then proceed with facilitating a transaction to transfer the incentive fee between the bank accounts of the first and second users.

In regards to implementing the incentive, various approaches may be appropriate. Continuing with the above example of an incentive fee, the first user may specify the amount they are willing to offer when they submit a request at step 210. In this case, the server may simply forward that amount to the second user when it facilitates communication with the second device at step 250. Alternatively, the first user may simply indicate an intention or authorization of an incentive fee in their request without specifying the exact amount, and the server may then determine an appropriate amount in many different ways. For example, the server may determine an amount using a machine learning model that takes into consideration various factors like the charge level of the target EV. The server may then confirm the amount with the first user, where the first user may make any desired changes to the amount, before it is forward to the second user as part of step 250. The second user may then subsequently propose a different amount, with the process being repeated either until an agreement is reached or the imposed limit of counteroffers is reached. Another implementation may include the first user specifying a limit on the amount in their request, and any amount that the server determines may be directly forwarded to the second user so long as that limit is not exceeded. However, these are just examples, and implementations in various embodiments may not only operate differently, but may execute at different points of method 200.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for processing a request for access to a power dispenser at a charging station including the particular steps of the method of FIG. 2, this disclosure contemplates any suitable method for processing a request for access to a power dispenser at a charging station including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
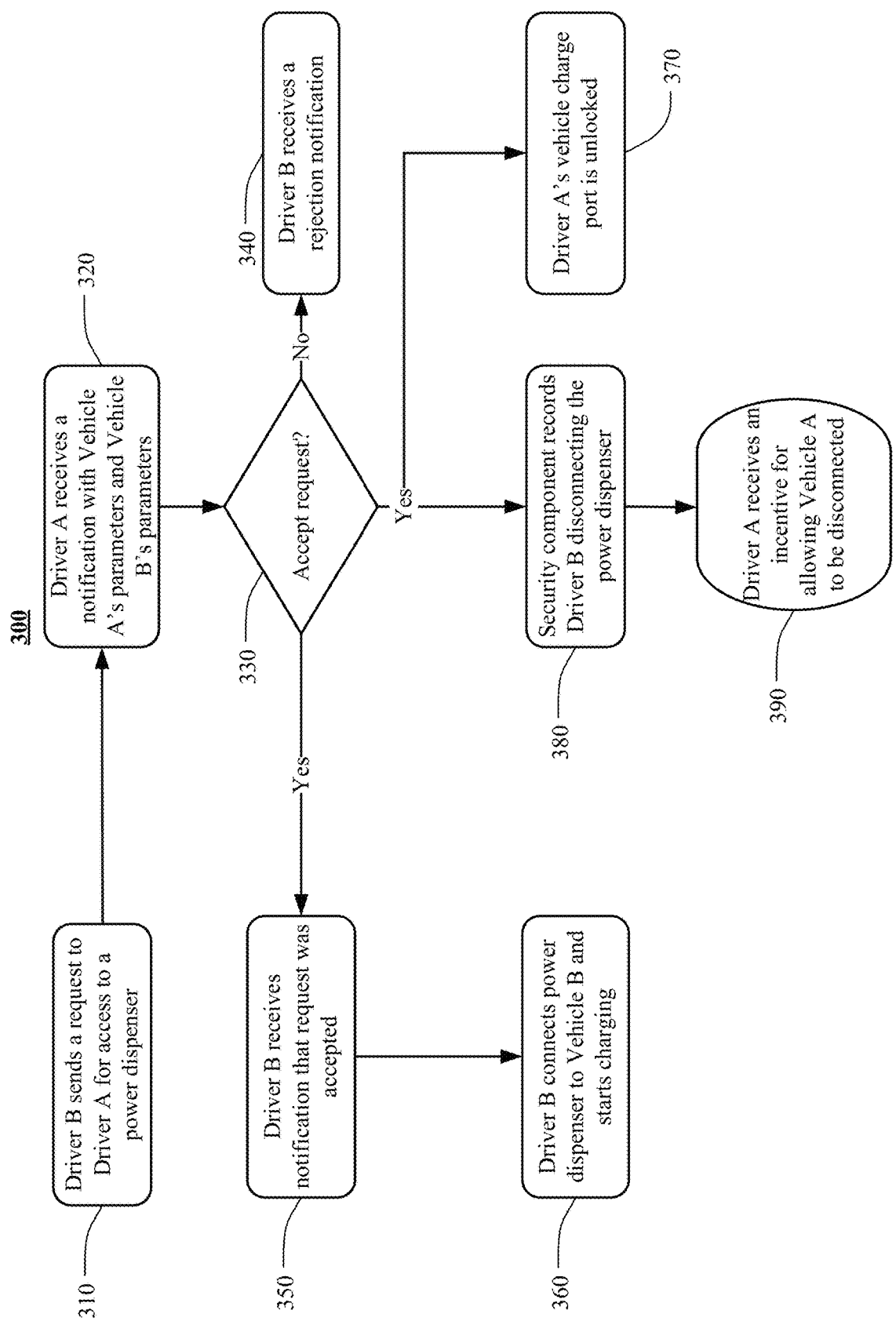
FIG. 3 illustrates a high level overview of the communication between two EV drivers.

FIG. 3 illustrates a high level overview of an exemplary method 300 of communication between two EV drivers. In some embodiments, the drivers described in method 300 correspond to the users described above with respect to method 200 illustrated in FIG. 2; the discussion of method 200 is incorporated into the discussion of method 300 for all purposes.

Method 300 begins with step 310, where a driver, Driver B, sends a request to another driver, Driver A, for access to a power dispenser that is connected to Driver A's EV. The request may also be equivalently considered a request by Driver B to Driver A to disconnect their EV from the power dispenser. Driver B may be the driver associated with EV 101 of FIG. 1 which may urgently need to connect to a power dispenser, while Driver A may be the driver associated with any of the other EVs 102 *a-d*.

Figure 4:
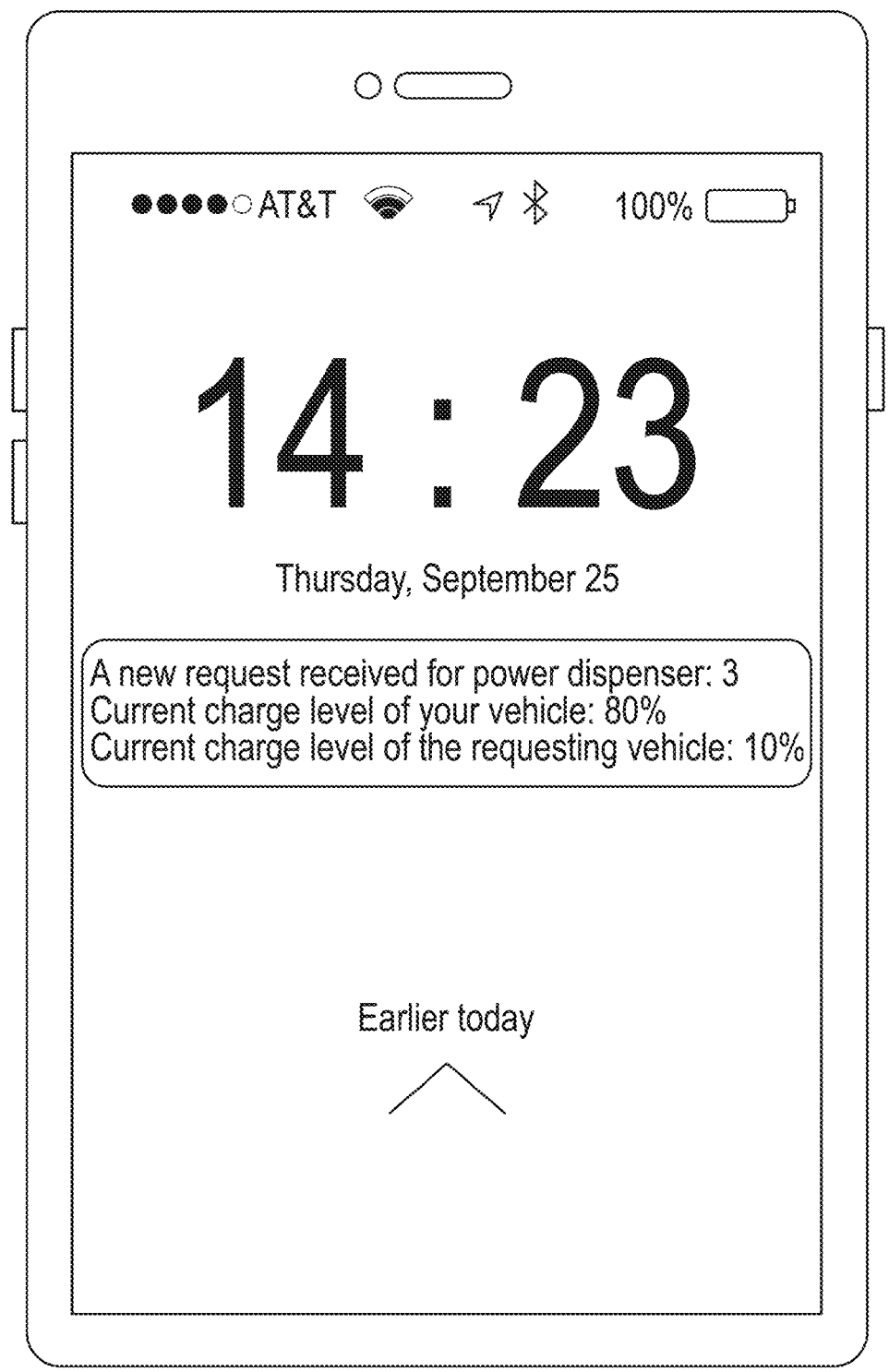
FIG. 4 illustrates an example notification an EV user may receive with the request to disconnect their EV from a power dispenser.

At 320, Driver A may receive a request. In some embodiments, Driver A receives the request only. In other embodiments, Driver A receives a notification with the request. The notification may be received on any electronic device, such as a mobile electronic device, and may include parameters for Vehicle A and Vehicle B, where Vehicle A is associated with Driver A and Vehicle B is associated with Driver B. The parameters included in the notification may be directed to any information that better helps Driver A decide whether to accept Driver B's request, such as the charge level of the two vehicles. If Driver A sees that their vehicle, Vehicle A, is at a full charge while the other vehicle, Vehicle B, is almost out of charge, Driver A may be more likely to accept the request than if Driver A was not able to see the vehicles' charge levels at the time of receiving the request. FIG. 4 illustrates an example notification that Driver A may receive with the request to disconnect their EV, vehicle A, from the power dispenser. The notification may include an indication of the power dispenser that the request is directed to, an indication of the current charge level of Vehicle A (which in the example is 80%), and an indication of the current charge level of Vehicle B that is associated with Driver B who is requesting access to the power dispenser (which in the example is 10%).

At 330, after receiving the request, Driver A may decide whether or not to accept it. If Driver A decides not to accept the request, then at 340, Driver B may receive a notification that their request was rejected. The specific notification may take various forms. In some cases, the notification may indicate that the request expired as this type of notification may keep Driver A's actions more private. In other cases, the notification may indicate that the request was rejected to better capture the fact that the request was rejected and not that it expired.

Figure 5:
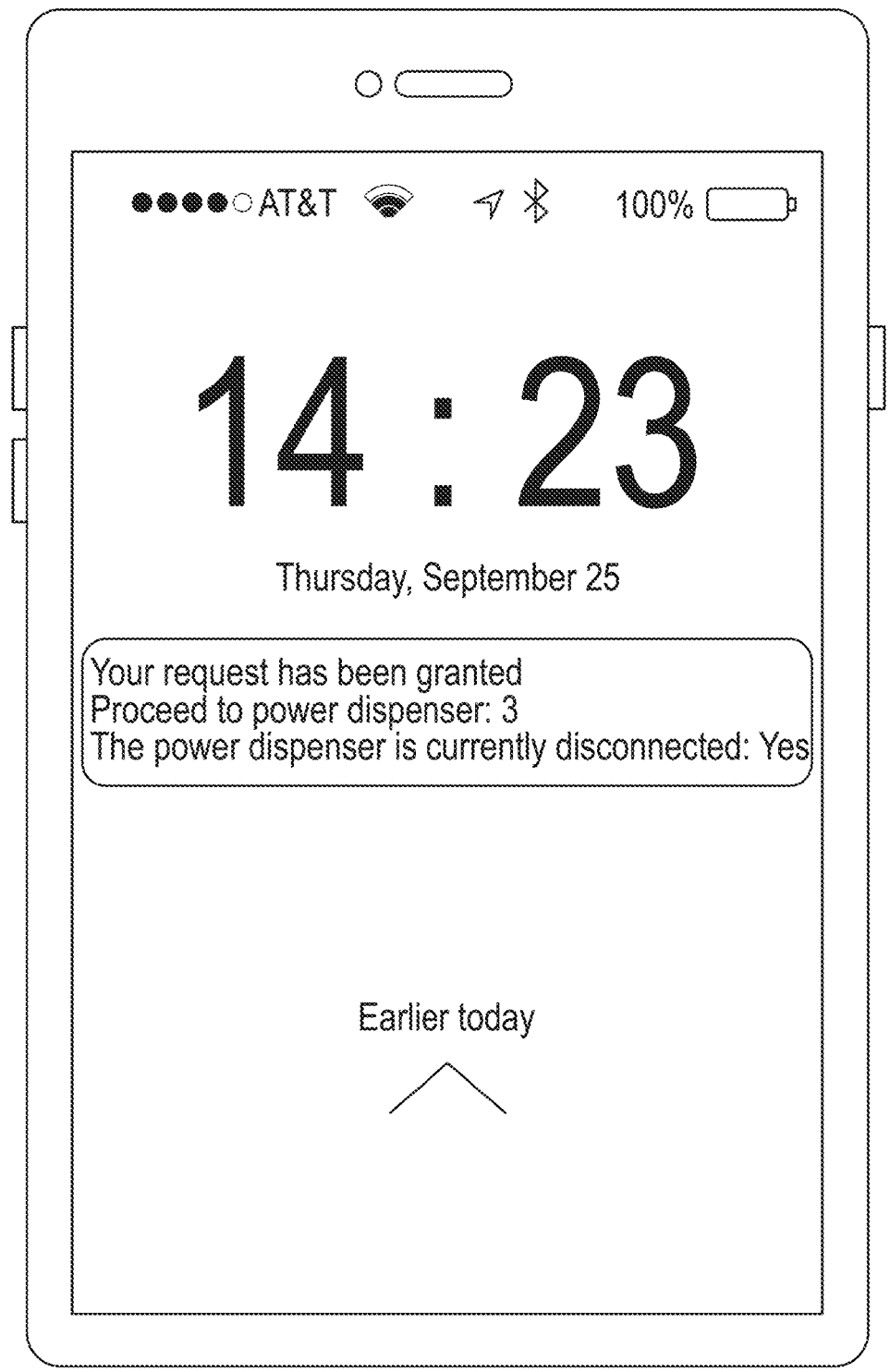
FIG. 5 illustrates an example notification an EV user may receive to inform them that their request for access to a power dispenser was accepted.

On the other hand, if Driver A decides to accept the request, then at 350, Driver B may receive a notification that their request has been accepted. The request acceptance notification may include various details, such as which power dispenser Driver B should proceed to and whether the power dispenser will already be disconnected, which may also help Driver B identify the correct power dispenser. At 360, Driver B may then connect the power dispenser to their vehicle, Vehicle B, and start charging. FIG. 5 illustrates an example notification that Driver B may receive to inform them that their request for access to a power dispenser was accepted. In the example notification, the notification may indicate the power dispenser that Driver B should proceed to, and whether that power dispenser is currently disconnected. In the case of the example, the power dispenser is currently disconnected, thus Driver B may not need to disconnect from the target EV and may immediately connect the power dispenser to their vehicle upon arriving at the dispenser.

When Driver A accepts the request, then additionally, at 370, the charge port on Driver A's vehicle, Vehicle A, unlocks so that the power dispenser can be disconnected from the EV. The power dispenser may have been initially locked by the charge port in order to prevent others from simply approaching Vehicle A and disconnecting the power dispenser without receiving authorization to do so from Driver A. At 380, a security component on Vehicle A may record Driver B disconnecting the power dispenser from Vehicle A.

When Driver A accepts the request and disconnects their vehicle from the power dispenser, then at 390, Driver A may also receive some sort of incentive or reward for allowing their Vehicle A to be disconnected from the power dispenser. The incentive may subsequently allow Driver A to receive various other benefits, such as increased charging speeds at certain power dispensers or various monetary rewards. The magnitude of the incentive may also correspond to how early Driver A accepts the request, such as receiving increasingly greater incentives for accepting the request while their vehicle is at lower charge levels. Specifically, Driver A may receive a greater incentive for accepting a request while their vehicle only has a 60 percent charge compared to accepting a request while their vehicle has a 90 percent charge.

Figure 6:
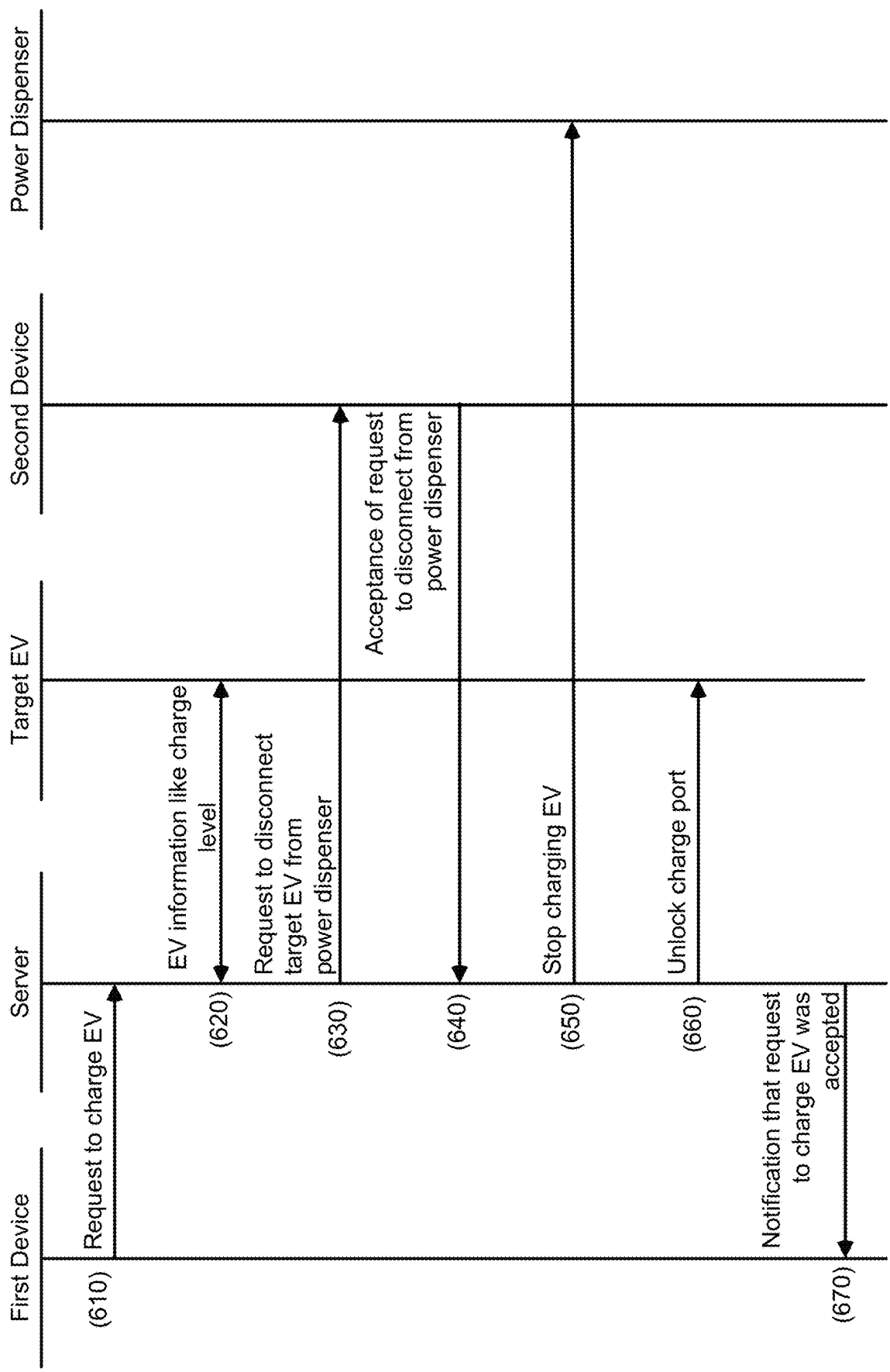
FIG. 6 is a diagram illustrating exchanges between the first device that submits a request for access to a power dispenser, the server that handles requests, the target EV, the second device associated with the target EV, and the power dispenser that is connected to the target EV.

FIG. 6 is a diagram illustrating the exchanges between a first device that submits a request for access to a power dispenser, a server that handles requests, a target EV, a second device associated with the target EV, and a power dispenser that is connected to the target EV. The exchanges depicted in FIG. 6 may reflect various steps in method 200 of FIG. 2; the discussion of method 200 is incorporated into the discussion of method 600 for all purposes. In FIG. 6, starting from exchange (610), the first device may submit a request to the server for access to a power dispenser in order to charge an EV. This exchange may correspond with step 210 of method 200. Subsequently, exchange (620) may include the server requesting information such as charge level data from the target EV and then receive that data from the target EV. In some embodiments, the server exchanges information with a plurality of EVs that are connected to the power dispensers at the charging station (for ease of explanation, only the target EV is illustrated in FIG. 6). This may be the case as the server would need information for multiple EVs in order to identify the target EV, as discussed above with regards to step 241 of method 200. Additionally, the specific data that is requested and received by the server through this exchange may vary in different embodiments, and may include multiple types of data. In various embodiments, this exchange may correspond with step 241 of method 200. In the third exchange (630), the server may transmit a request to the second device that is associated with the target EV to disconnect the target EV from the power dispenser. This exchange may correspond with step 250 of method 200. Following this, with exchange (640), the second device may transmit an acceptance of the request back to the server. This exchange may correspond with step 260 of method 200. After the server receives the acceptance of the request from the second device, for exchange (650), the server may transmit a signal to the power dispenser to stop charging the EV that is connected to that power dispenser, and transmit another signal (660) to the target EV to unlock the charge port so that the power dispenser may be disconnected. These two exchanges may correspond with step 270 of method 200. Once the charge port has been unlocked, at exchange (670), the server may transmit a notification to the first device that its request for access to a power dispenser has been accepted. Various embodiments may implement a different order for the exchanges depicted in FIG. 6. For example, it may be possible to switch the order of exchanges (650) and (660) such that the signal to unlock the charge port is transmitted to the target EV before the signal to stop charging the target EV is transmitted to the power dispenser. In such embodiments, this approach would mean that the power dispenser may be disconnected from the power dispenser before the flow of electricity in the power dispenser has been stopped, which benefit from additional security safeguards.

Figure 7A:
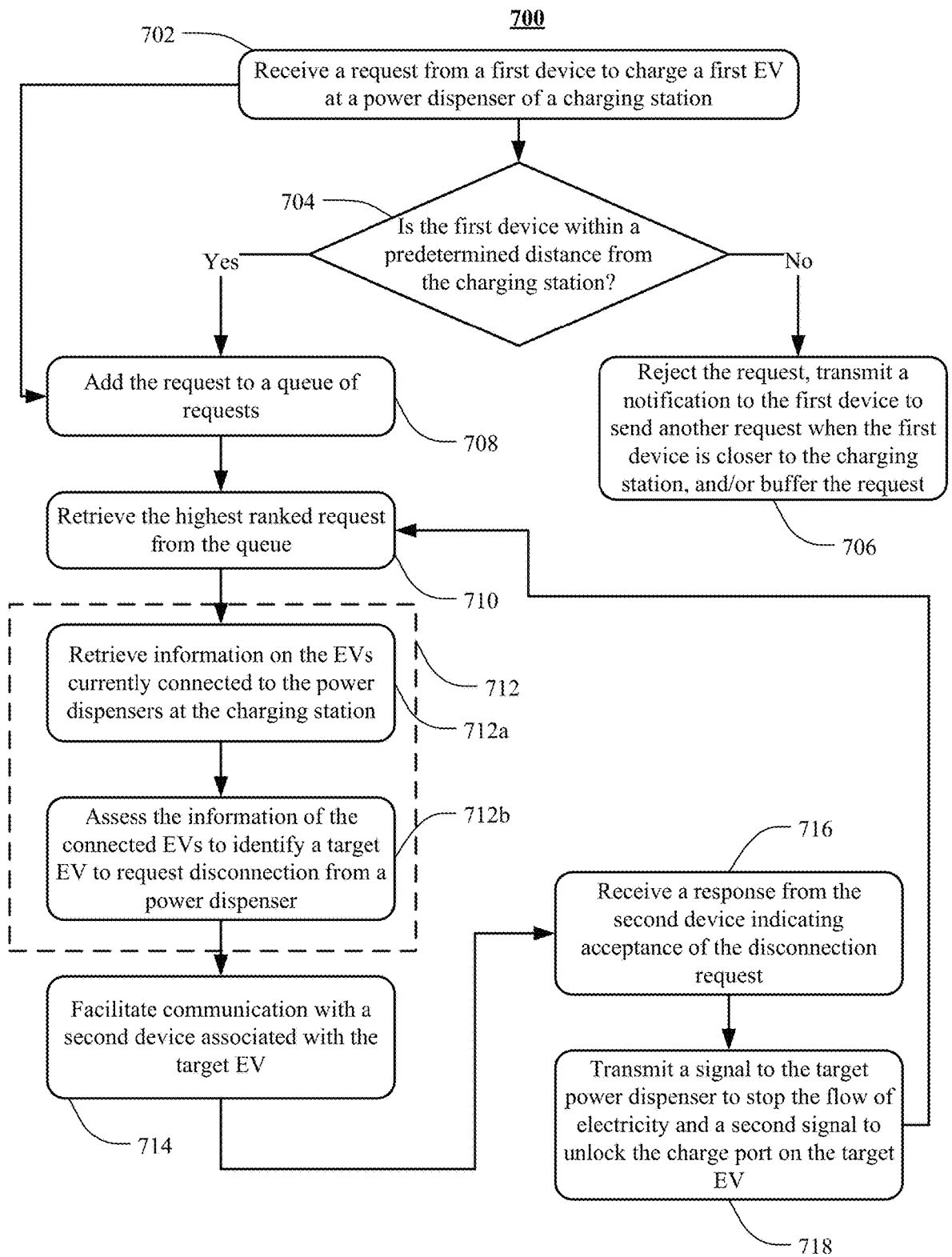
FIG. 7A depicts a flowchart illustrating steps in a method to handle scenarios where new requests arrive before existing requests have been processed.

In situations where method 200 of FIG. 2 may be applied to charging stations with many users that desire access to power dispensers, it may be the case that multiple requests are received in quick succession by the server where new requests arrive before earlier requests have been completely processed. FIG. 7A depicts a flowchart illustrating steps in a method 700 for scenarios where new requests arrive before existing requests have been processed. Many steps in method 700 may correspond to steps in method 200 of FIG. 2; the discussion of method 200 is incorporated into the discussion of method 700 for all purposes. Method 700 may start at step 702 where the server receives a request from a first device for access to a power dispenser in order to charge a first EV. In various embodiments, step 702 may correspond to step 210 of method 200. At optional step 704, the server may determine whether the first device is within a predetermined distance from the charging station when the request was submitted. In various embodiments, step 704 may correspond to step 220 of method 200. Additionally, with step 704 being optional, various embodiments may execute step 708 directly after step 702. If the server determines that the first device is not within the predetermined distance when the request was submitted, at step 706, the server may process the request in any appropriate manner that does not result in the request being accepted. In various embodiments, step 706 may correspond to step 230 of method 200. Additionally, step 704 and step 706 may also be optional in various embodiments, as described above with regards to step 220 and step 230 of method 200.

If the server instead determines that the first device is within the predetermined distance to the charging station when the request was sent, then at step 708, the server may add the request to a queue of earlier requests that were received for the same charging station. Information associated with a request, such as the user that submitted the request, the EV that is associated with that user, or the charge level of the EV, etc., may be received within or as part of the request, thus this queue may also be considered a queue of anything that is part of a request, such as a queue of users that have submitted requests, a queue of EVs that need charging, etc. This queue may rank the requests based on any appropriate factor(s), such as the urgency of the requests. In different embodiments, (1) urgency may be based on the order in which the requests were received by the server, where requests that are received earlier are perceived to have higher urgency and are thus ranked higher in the queue; (2) urgency may be based on the distance of a device from the charging station, where requests received from devices closer to the charging station are perceived to have higher urgency; (3) urgency may be based on the charge level of the EV associated with the request when the request was submitted, where requests associated with EVs with lower charge levels are perceived to have higher urgency; or (4) urgency may be based on a combination of factors, such as the order of receipt and the charge level of the EV. The requests that have a higher ranking in the queue, or effectively those that are perceived to have higher urgency, may be processed earlier than the requests with a lower ranking, or effectively those that are perceived to have lower urgency.

After the request is added to the queue and any re-ranking of the requests is completed, at step 710, the server may retrieve the highest ranked request from the queue in order to process it. Because there may be other requests in the queue that are ranked higher than the latest request that was added to the queue, the request that is retrieved at step 710 may not necessarily be the request that was just added. Additionally, because the time that it takes to process a request may not line up exactly with the time between requests arriving at the server, it may be better if step 710 and subsequent steps do not execute strictly after step 708. Having step 710 execute strictly after step 708 may result in a request being processed only if a new request is received by the server. But because new requests may arrive faster than any request may be processed, this may result in lower ranked requests never being processed at some point if no more new requests are received at the server. Thus, in various embodiments, step 710, and subsequent steps, are executed in parallel to step 708. In other words, steps 710 through 718 may execute as a separate process to continuously check if there are any requests in the queue, and processing them if there are. Thus, step 710 may execute after step 708, but is not required to do so, and in some cases may not. Similarly, after step 718 when a request has been completely processed, because it is both possible that there are more requests in the queue that need to be processed (which would require step 710 and subsequent steps to be executed) and that there are no more requests (which would not require step 710 and subsequent steps to be executed), the flow of method 700 may or may not flow from step 718 back to step 710.

Processing the requests in the queue may be done through steps 710 to 718. At step 712, method 700 may conduct an assessment of the information of the EVs connected to the power dispensers in order to identify a target EV to request disconnection of the power dispenser, which may be broken into steps 712a and 712b. At step 712a, the server may retrieve information on the EVs currently connected to power dispensers, and at step 712b, the server may assess the information to identify the target EV to request disconnection from the power dispenser. In various embodiments, step 712, 712a, and 712b may correspond to steps 240, 241, and 242 of method 200, respectively. At step 714, the server may facilitate communication with a second device associated with the target EV. In various embodiments, step 714 may correspond to step 250 of method 200. At step 716, the server may receive a response from the second device indicating acceptance of the disconnection request. In various embodiments, step 716 may correspond to step 260 of method 200. And at step 718, the server may transmit signals to the target power dispenser to stop the flow of electricity and to the target EV to unlock the charge port. In various embodiments, step 718 may correspond to step 270 of method 200.

As described above, at step 706 of method 700, the server may process a request in any appropriate manner that does not result in the request being accepted, since the request was received from a device that was not within the predetermined distance from the charging station. Although many approaches are possible, one potential approach may be to buffer the request without immediately responding to the first user which submitted the request, and subsequently, querying the position of the first user through the GPS of the first device to determine when the first user comes within the predetermined distance. Once the first user is within the predetermined distance, the condition at step 704 may be satisfied, and the request may be processed accordingly. Various embodiments combine a buffer and a queue.

Figure 7B:
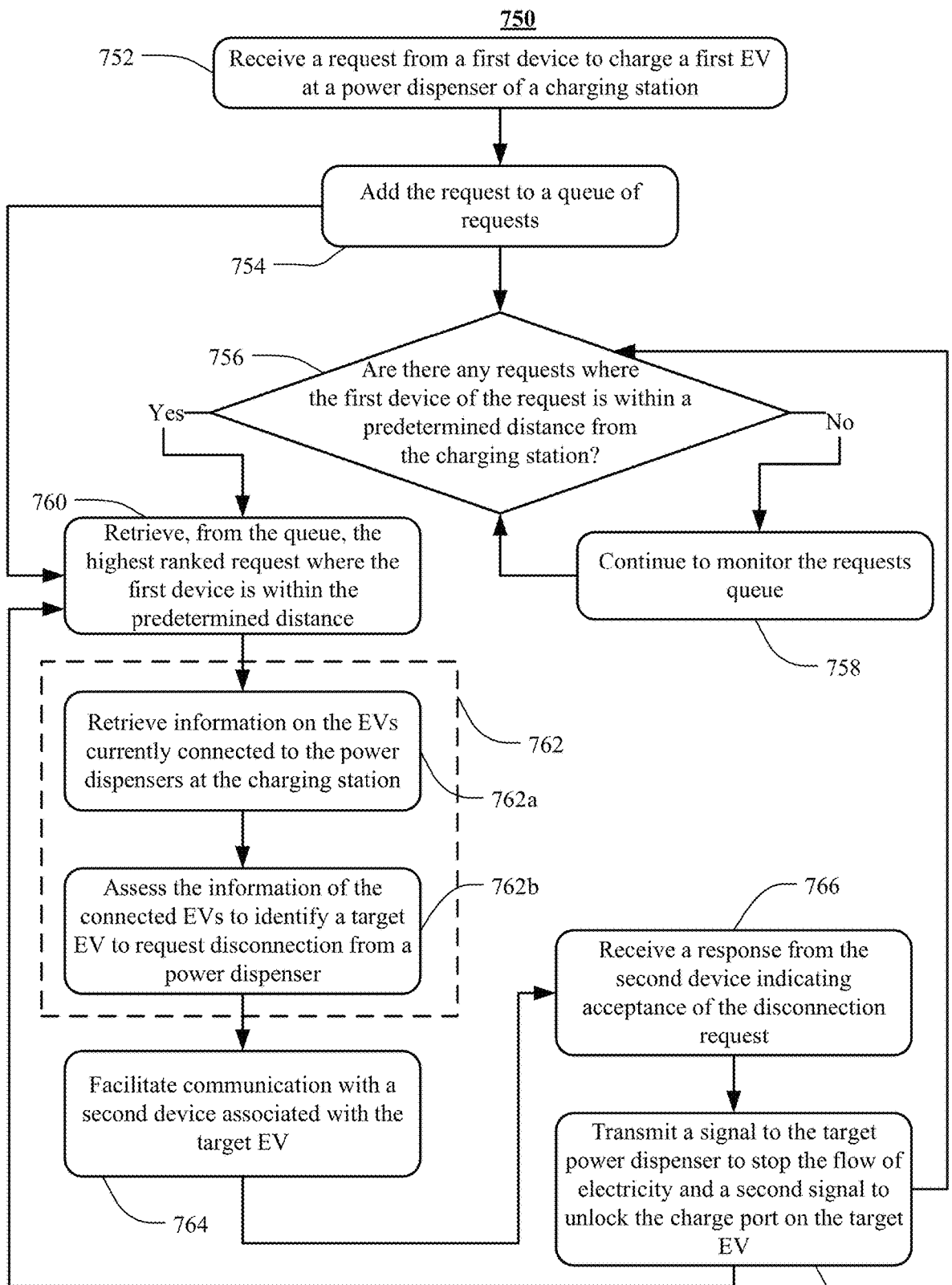
FIG. 7B depicts a flowchart illustrating steps in a method for handling requests where a single queue is maintained for different types of requests.

FIG. 7B depicts a flowchart illustrating steps in a method 750 for handling requests where a single queue is maintained for requests submitted from devices within a predetermined distance from the charging station and requests submitted from devices that are not within the predetermined distance. In method 750, and unlike method 200 and 700, right after receiving the request from the first device at step 752, the request may be added to a queue of requests at step 754. The requests in this queue may still be ranked, with higher ranked requests being processed earlier than lower ranked requests, but because the queue includes requests that are within the predetermined distance from the charging station, and thus should be processed as soon as possible, as well as requests not within the predetermined distance, and thus should not be processed until the user that submitted the request is within the predetermined distance, the ranking schematic may need a way to account for the different types of requests. Although many approaches may be appropriate, an exemplary approach may be to simply adjust the ranking of any request submitted from outside the predetermined distance such that the request would be ranked lower than all the requests submitted from within the predetermined distance. Specifically, if the ranking schematic ranks requests for EVs with lower charge levels higher than requests for EVs with higher charge levels, method 700 may add requests to the queue without any preprocessing, but method 750 may preprocess requests submitted from outside the predetermined distance. For such requests, the real charge level of the EV associated with the request may be temporarily ignored, and an artificial charge level of 101% is associated with the request. Assuming EVs are unable to naturally have a charge level of 101%, this would mean all the EVs for requests submitted within the predetermined distance will have charge levels lower than 101%, which would result in all of the requests submitted outside the predetermined distance being ranked lower and thus processed later. However, as described above with regards to step 220 of method 200, because various embodiments may not differentiate between requests submitted from devices within a predetermined distance and those beyond the predetermined distance to the charging station, various embodiments of method 750 may not need this preprocessing, but the present disclosure will continue to describe method 750 from the perspective that the two types of requests are differentiated.

Additionally, even though certain requests may have been submitted by devices outside of the predetermined distance from the charging station, those devices and the users associated with those devices would likely continue to proceed towards the charging station. At some point, those devices and users would enter within the predetermined distance, in which case the status of the corresponding request should be updated. In order to accurately reflect such developments, the server may continuously query the devices associated with requests submitted outside the predetermined distance for their GPS location, and once the location is within the predetermined distance, the corresponding request may be updated. Updating the request may include reverting the artificial ranking that was originally assigned to the request so that the request may now be accurately ranked according to the ranking schematic. Using the above example, requests that may have originally had the associated EV's charge levels artificially increased to 101% may now be updated such that they are ranked according to the actual charge level of the EV associated with the request. Subsequently, these requests may be considered alongside the requests originally submitted within the predetermined distance, with the higher ranked requests being processed earlier.

After requests have been added to the queue, at step 756, the server may monitor the queue to determine if there are any requests where the device associated with the request, or equivalently the device that submitted the request, is within the predetermined distance. Like steps 708 and 710 of method 700 in FIG. 7A, step 754 of method 750 may not be executed strictly before step 756; step 756 and all subsequent steps may execute as a parallel process. If the server determines that there are no requests in the queue where the associated device is within the predetermined distance, then the server, through step 758, may continue to monitor the queue for any requests that meet the condition of 756. Additionally, it may be noted that in embodiments where requests submitted within the predetermined distance and beyond the predetermined distance are not differentiated, step 756 and 758 may also become optional. As a result, various implementations may execute step 760 after 754. On the other hand, if the server determines that there is a request where the associated device is within the predetermined distance, the server may proceed to step 760 to process the request. The remainder of the steps of method 750 are largely similar to the steps of method 700. At step 760, the server may retrieve the highest ranked request from the queue, which may correspond to step 710 of method 700. At step 762, the server may conduct an assessment of the information of the EVs connected to the power dispensers in order to identify a target EV to request disconnection of the power dispenser, which comprises steps 762a and 762b. In various embodiments, steps 762, 762a, and 762b may correspond to steps 712, 712a, and 712b of method 700. At step 764, the server may facilitate communication with the second device associated with the target EV by transmitting a notification with the request to disconnect the power dispenser, which may correspond to step 714 of method 700. At step 766, the server may receive a response from the second device indicating acceptance of the request, which may correspond to step 716 of method 700, and at step 768, the server may transmit signals to the target power dispenser to stop the flow of electricity and the target EV to unlock the charge port, which may correspond to step 718 of method 700. Following step 768, the flow of method 750 may return back to the condition at 756 in order to handle any additional requests that may be in the queue. In embodiments where step 756 is not implemented, the flow of method 750 may return back to step 760, and because it is both possible that there are more requests in the queue that need to be processed and that there are no more requests, the flow of method 750 may or may not flow from step 768 back to step 760.

At various steps in methods 200, 700, and 750, the server identifies a target EV and then transmits a request to disconnect the power dispenser connected to the target EV to a second device associated with the target EV. After receiving a response indicating acceptance of the request, the power dispenser is disconnected from the target EV, at which point the user that submitted the request, i.e. the first user associated with the first device, may proceed to that power dispenser and connect their EV, the first EV. An effect of this approach is that the server determines the power dispenser that the disconnection request will be directed towards through the identification of the target EV. This removes control from the users that submit the disconnection requests, but various embodiments may adjust certain steps of method 200 so that the users submitting the requests have more control.

Figure 8:
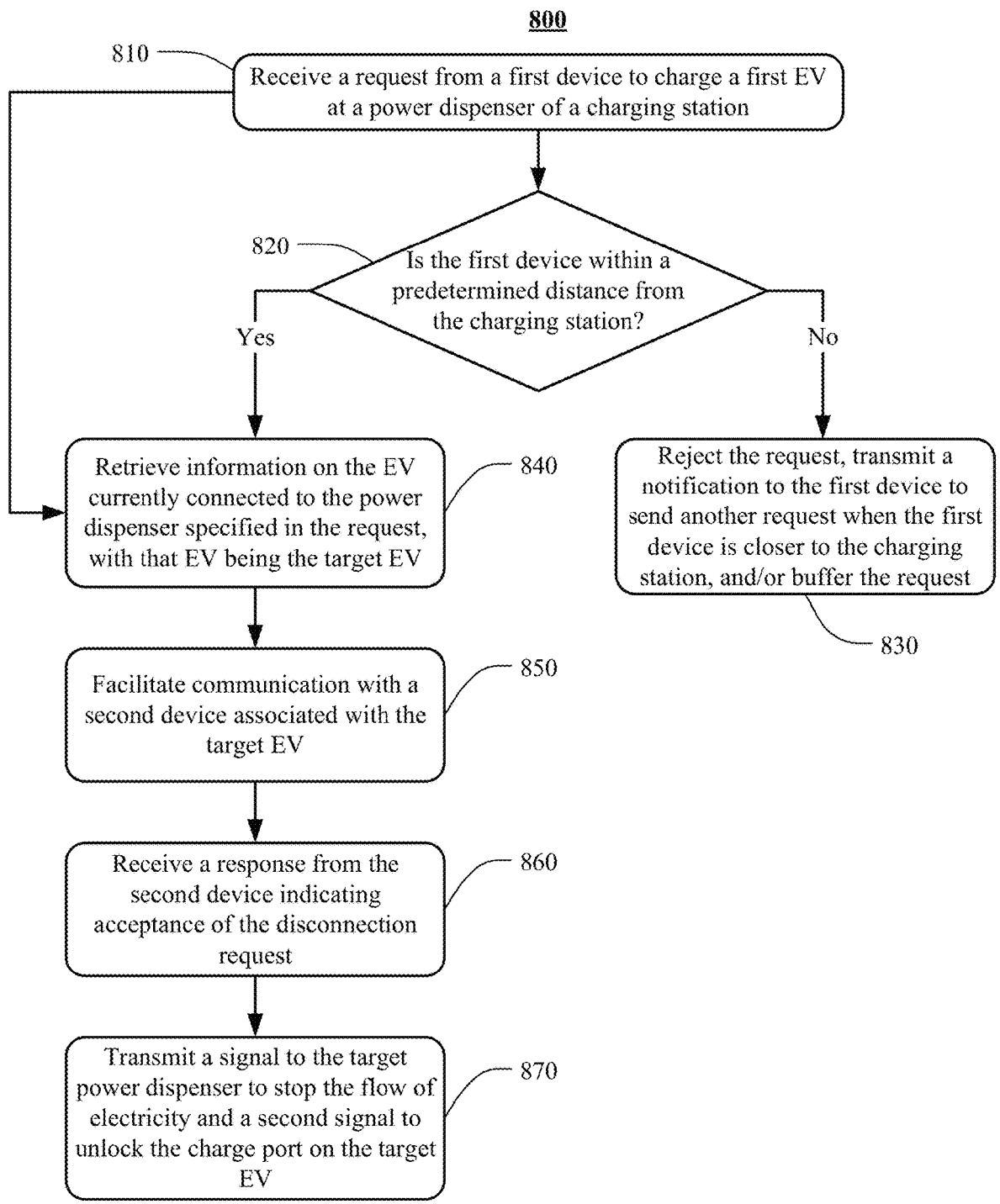
FIG. 8 depicts a flowchart illustrating steps in a method where an EV user submitting requests may specifically select a power dispenser.

FIG. 8 depicts a flowchart illustrating steps in a method 800 modified from method 200 where a user submitting requests may specifically select a power dispenser that their request will be directed toward, where various steps of method 800 remain largely similar to the steps in method 200; the discussion of method 200 is incorporated into the discussion of method 800 for all purposes. At step 810, the server may receive a request to charge a first EV at a power dispenser, which may correspond to step 210 of method 200. However, the requests in method 800 may allow the first user submitting the request to identify a specific power dispenser they would like to request access to. When the first user submits the request at step 810, a specific power dispenser may be specified using any appropriate approach. This may include scanning a QR code that is displayed on the power dispenser that uniquely identifies that particular power dispenser, or inputting a universally unique identifier (UUID) for that particular power dispenser. Additionally, to allow users to better identify which power dispensers may likely result in their request for access being accepted, various non-private information associated with the user associated with the EV connected to the power dispenser may be made available to the first user, or the user submitting the request. This information may include the current charge level of the EV connected to the power dispenser or the social rating of the user associated with the EV. The information may also be made available in any appropriate manner, such as being displayed on the power dispenser or displayed on the first user's device, the first device, after the power dispenser is identified, such as by scanning a QR code or inputting a UUID, but before an actual request is submitted to the server.

Because the request already identifies a particular power dispenser when it is received by the server, the server may no longer need to identify a target EV based on an assessment of the EVs connected to the power dispensers at the charging station. Instead, the EV connected to the power dispenser specified in the request would automatically become the target EV. Thus, after the server determines that the first device that submitted the request is within the predetermined distance from the charging station at step 820, the server may proceed directly to retrieving information on the target EV connected to the specified power dispenser at step 840. Once the target EVs information has been retrieved, the request may be processed following the flow from step 850 to step 870, which may correspond to steps 250 to step 270 of method 200 in FIG. 2. Additionally, although steps 820 and 830 may be optional in various embodiments for the same reasons as steps 220 and 230 as described above, another reason that those steps may be optional is that since the first user is specifically identifying a power dispenser in the request that is received at step 810, this may mean that the first user is already at the charging station (i.e., how they were able to identify the power dispenser). Thus, step 820 and 830 may not be necessary as there is only one possible outcome for the condition at step 820, which is that the first device is within the predetermined distance from the charging station, and consequently, step 830 may never be executed.

It may be noted that various embodiments may implement various combinations of methods 200, 700, 750, and 800 as they are described herein to introduce a method comprising particular features of the aforementioned methods. For example, various embodiments may implement a combination of methods 700 and 800 which allows requests to include a particular power dispenser that the submitting user would like to connect to, while also supporting a queue with ranked requests which are processed according to the queue's ranking schematic. However, the number of potential combinations and variants of the methods described herein may be very large and thus, not practical to be listed exhaustively herein.

Up to this point, the present disclosure has described the processing of requests from the perspective that the request would be accepted by the second user that is associated with the target EV connected to the power dispenser. Specifically, methods 200, 700, 750 and 800 assume that at steps 260, 716, 766, 860, respectively, the response that is received from the second device indicates acceptance of the disconnection request. In other words, the methods assume that the second user, which is the user associated with the second device and the target EV, agrees to disconnect the power dispenser from the target EV to allow the first user, which submitted the request for access to a power dispenser, to connect the first EV to the power dispenser. However, it may very well be the case that the second user's response does not directly accept the request and may even reject the request.

Figure 9:
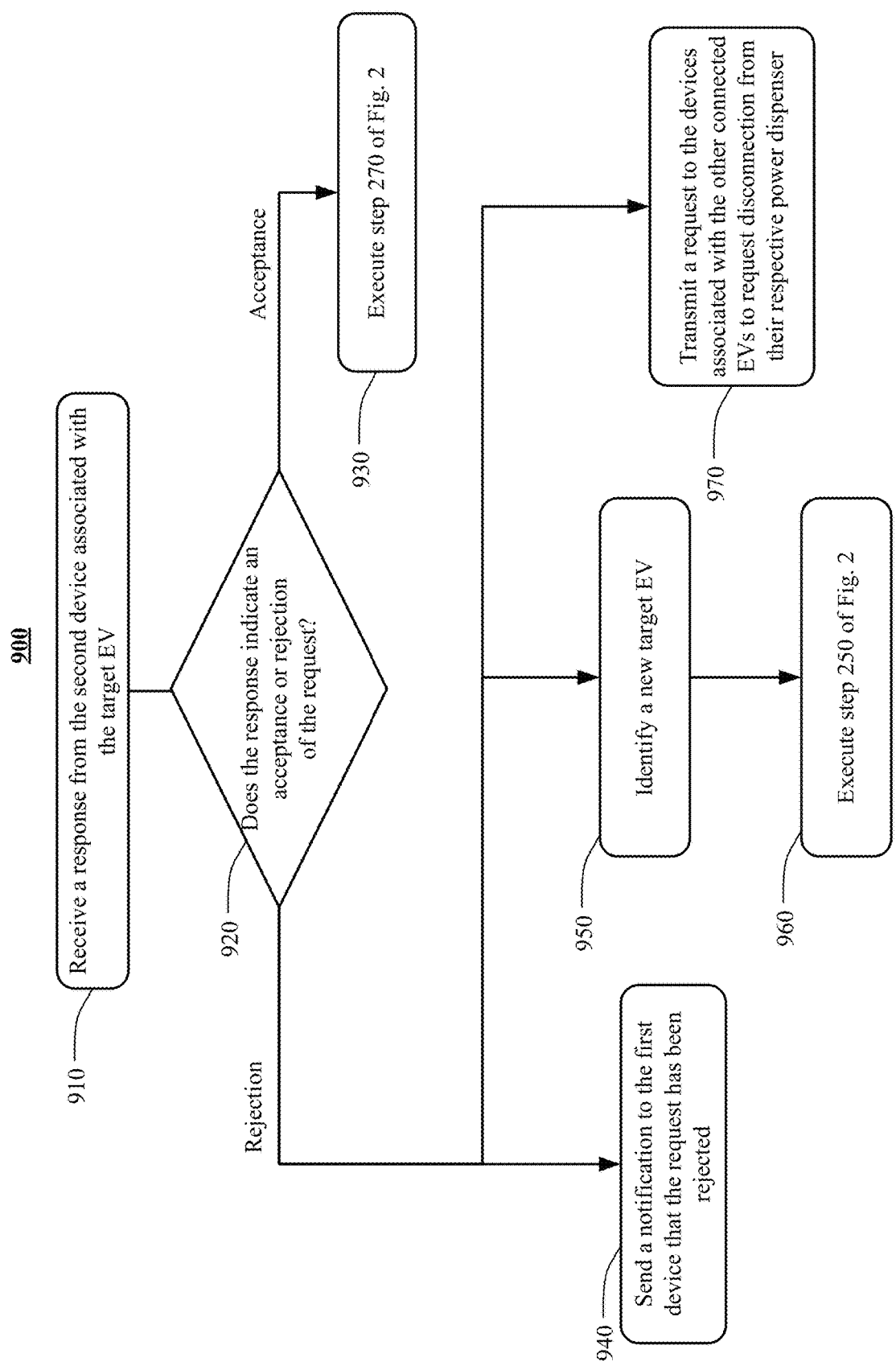
FIG. 9 depicts a flowchart illustrating steps in a method for handling different types of responses from the user associated with the target EV.

FIG. 9 depicts a flowchart illustrating steps in a method 900 for handling different types of responses that may be received from the second user associated with the target EV. At step 910, the server may receive the second user's response from the second device that is associated with the target EV. At step 920, the server may determine whether the response indicates an acceptance or rejection of the request. If the server determines that the response indicates an acceptance of the request, then at step 930, the server may proceed to execute step 270 of FIG. 2, which as described above, may comprise the server transmitting signals to stop the flow of electricity in the power dispenser and unlock the charge port so that the power dispenser may be disconnected. Effectively, the server receiving the response at step 910 and then subsequently determining that the response indicates an acceptance of the request at step 920 together may correspond with step 260 of method 200 in FIG. 2.

On the other hand, at step 920, the server may determine that the response from the second device, or effectively the second user associated with the target EV, indicates a rejection of the request to disconnect from the power dispenser. In this case, the subsequent steps of method 900 may be executed in method 200 as an alternative to step 260 of FIG. 2. In some embodiments, in response to a rejection, at step 940, the server may transmit a notification to the first device to inform the first user that their request has been rejected. The notification may specifically indicate that the request has been rejected, but in various embodiments, for various reasons, it may be desirable to mask the fact that the first user's request failed due to being rejected by some other user. As such, the notification may also just indicate that the first user's request failed due to the request expiring. In some embodiments, in response to a rejection, the request process is repeated with another target EV. This approach may comprise step 950 where a new target EV is identified. Identifying the new target EV may simply comprise identifying the next highest evaluated EV after the original target EV based on the assessment from step 242 of method 200. Alternatively, in order to account for any potential changes that may have happened between the initial assessment and the rejection response that was received, another assessment may be conducted on the EVs connected to the power dispensers, other than the original target EV where the associated user just rejected the request. Regardless of how the new target EV is identified, once it is, at step 960, the process of requesting the target EV be disconnected from the power dispenser may be repeated with the newly identified target EV by executing step 250 and subsequent steps of method 200 in FIG. 2. In some embodiments, in response to a rejection, a process may be based on the idea that, because the original target EV was identified based on that EV having the highest chance of resulting in the request being accepted, the request was rejected means that forwarding the request to any of the other EVs connected to the power dispensers would have an even lower chance of being accepted. As such, in order to maximize the probability that the request is accepted under such a scenario, at step 970, the server may transmit a request to the devices associated with the remaining EVs that are connected to power dispensers. Thus, the original request for access to a power dispenser from the first user may be considered accepted as long as any of the responses from the devices associated with the remaining EVs indicate an acceptance.

On another note, in various embodiments, the second user's response to the request received from the second device may not necessarily only comprise explicit acceptances or rejections. For example, the response received at step 910 may indicate that the second user associated with the target EV was not completely sure at the moment whether they wanted to accept or reject the request and would instead provide their final response at some later time. Firstly, if this was the response that was received and no final response was received after some predetermined time period, the server may transmit a reminder to the second device to remind the second user to provide their final response. When the final response is received, only then may an acceptance or rejection be determined, in which case one of the steps between 930, 940, 950, and 970 may be executed as appropriate. Another response that may be received at step 910 may be no response at all. In other words, the second user may not respond to the request at all, for any number of reasons. This response, although not an explicit rejection, may nonetheless be considered as one, and thus one of steps 940, 950, and 970 may be executed once the server confirms that the second user does not intend to provide a response, such as after the passage of some predetermined amount of time. While only two additional responses are discussed herein, any number of responses may be supported in various embodiments.

Figure 10:
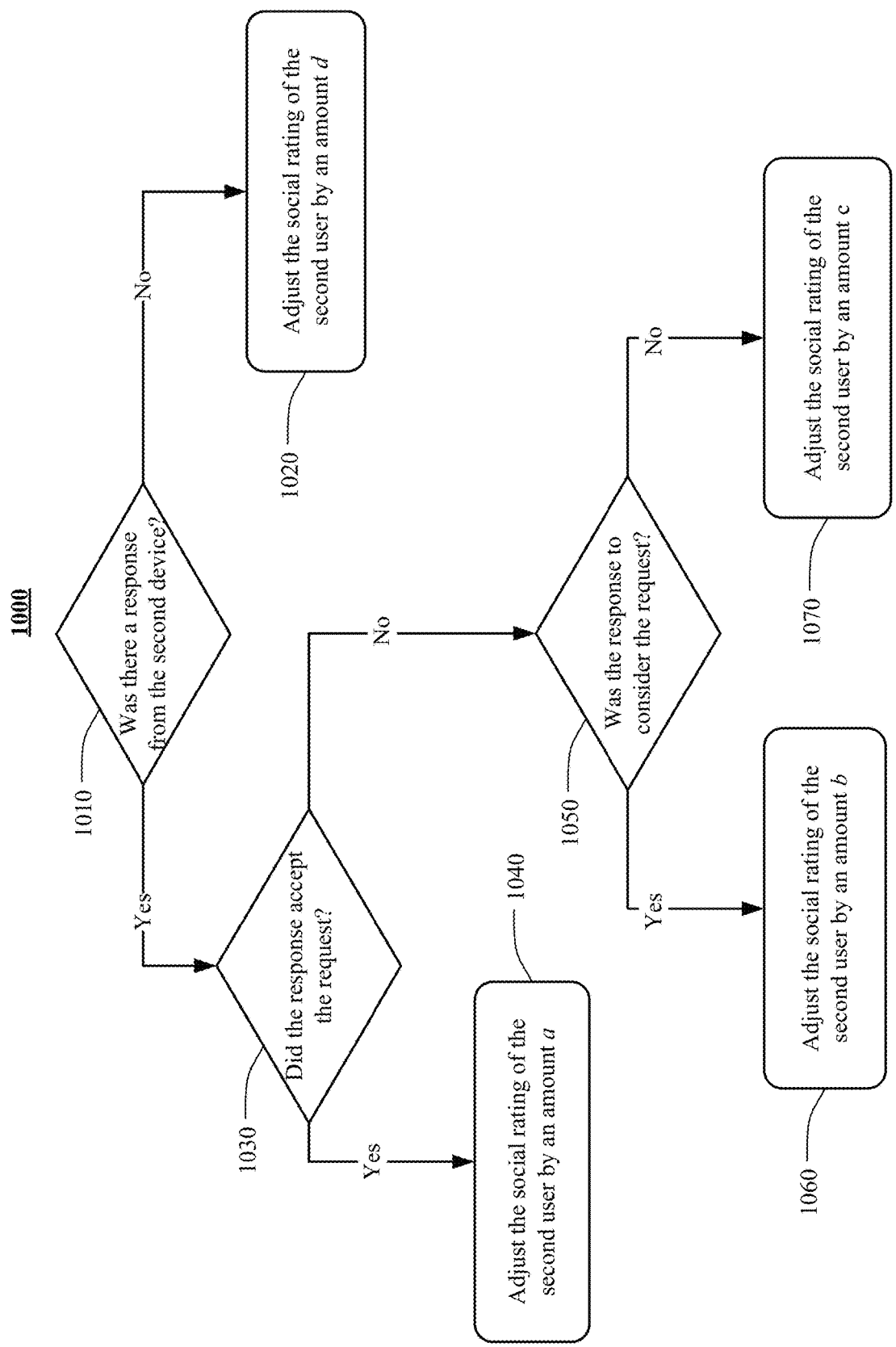
FIG. 10 depicts a decision tree illustrating steps in a process for determining how to adjust the social rating of a user based on their response to a request.

As mentioned briefly above, each user that interacts with the server may have an associated social rating that reflects a user's behavior at charging stations, where the social rating may be stored in a data store that is accessible by the server. The data store for the social ratings may or may not be the same as the one storing the information on the EVs that is retrieved at step 241 of method 200. As the social rating reflects a user's behavior, the rating may be affected by a number of different factors, such as how they respond to requests to disconnect the EV that is associated with them from a power dispenser. FIG. 10 depicts a decision tree illustrating steps in a process 1000 for determining how to adjust the social rating of the second user based on their response, where process 1000 may be executed before or after receiving the response from the second user at step 260 of method 200. Although there are many possible responses that may be received from the second user, process 1000 focuses on the particular responses discussed above in relation to FIG. 7, however, the general flow may be applied to many other types of responses. At 1010, the server may first determine whether there was a response at all from the second device. If the second user does not respond to the request and no response is received, then at 1020, the social rating of the second user may be adjusted by an amount d. On the other hand, if a response was received from the second device, at 1030, the server may then determine whether the response was an acceptance of the request. If the response indicates that the second user accepted the request, then at 1040, the social rating of the second user may be adjusted by an amount a. If the response does not indicate an acceptance of the request, then at 1050, the server may determine whether the response from the second user indicated that they would consider the request and subsequently provided a final response. If the second user did indicate that they would consider the request, then after the final response is received, at 1060, the social rating of the second user may be adjusted by an amount b. Finally, if the second user indicated they would not even consider the request, at 1070, the server may conclude process 1000 and adjust the social rating of the second user by an amount c.

Although the specific amounts that the social rating is adjusted by may be somewhat immaterial, the relative adjustment amounts may seek to reinforce the fact that the social rating reflects a user's behavior, such that, for example, higher social ratings indicate better or more altruistic behavior and vice versa. Consequently, the adjustment amount a, for the second user's response indicating acceptance of the request, may be associated with the largest increase to the social rating as such a response may be the most beneficial response (among the particular responses listed above) to the first user requesting access to a power dispenser, and consequently, may be considered the most desirable behavior from the second user. The adjustment amount b, for the second user's response indicating that they would at least consider the request, may be the next largest increase to the social rating given that such a response is still somewhat beneficial to the first user but not as much as an immediate acceptance. Additionally, the adjustment amount b may comprise adjustment amount $b_1$ if the final response indicates an acceptance of the request, and an adjustment amount $b_2$ if the final response indicates a rejection of the request, where $b_1 > b_2$, as a final response of an acceptance may be more positive to the first user than one with a rejection. The adjustment amounts c and d, associated with a response that rejects the response and not providing a response at all, respectively, may be less than a and b since such responses may be less beneficial to the first user and thus do not increase the second user's social rating as much as adjustment amounts a and b to reflect that fact.

In addition to the responses a user provides to requests, the social rating may also be affected by other factors, such as how quickly they disconnect power dispensers after their EV reaches a full charge or even how quickly they respond to requests. Specifically, a user's social rating may be adjusted differently if they usually disconnect power dispensers very soon after their EV reaches a full charge than if they usually leave their EVs connected for longer periods of time even if the EV is fully charged. Similarly, a user's social rating may be adjusted differently if they respond quickly to requests than if they take longer periods of time to respond. By introducing a gamification aspect to the social rating, users may be more incentivized to exhibit good social behavior at charging stations in order to raise their social ratings. For further incentive, the social rating may also allow a user to obtain rewards or benefits according to their social rating, such as various types of monetary rewards or access to faster charging speeds at power dispensers.

Figure 11:
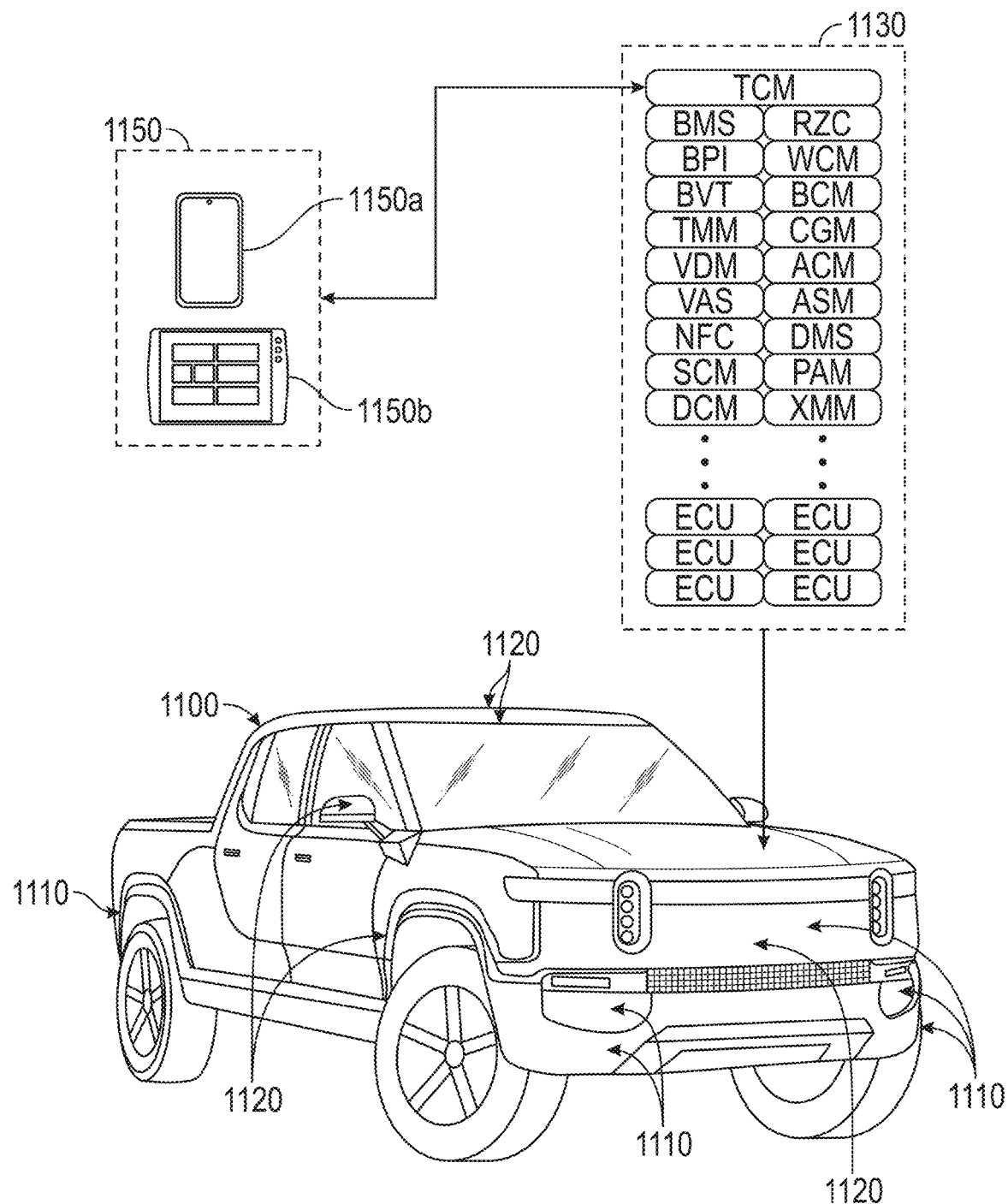
FIG. 11 illustrates an example vehicle.

FIG. 11 illustrates an example vehicle 1100. Vehicle 1100 may include multiple sensors 1110, multiple cameras 1120, and a control system 1130. In some embodiments, vehicle 1100 may be able to pair with a computing device 1150 (e.g., smartphone 1150*a*, tablet computing device 1150*b*, or a smart vehicle accessory). As an example and not by way of limitation, a sensor 1110 may be an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 1120 may be a still image camera, a video camera, a 3D scanning system (e.g., based on modulated light, laser triangulation, laser pulse, structured light, LiDAR), an infrared camera, another suitable camera, or a combination thereof. Vehicle 1100 may include various controllable components (e.g., doors, seats, windows, lights, heating, ventilation, and air conditioning (HVAC), entertainment system, security system), instrument and information displays and/or interactive interfaces, functionality to pair a computing device 1150 with the vehicle (which may allow control of certain vehicle functions using the computing device 1150), and functionality to pair accessories with the vehicle, which may then be controllable through an interactive interface in the vehicle or through a paired computing device 1150.

Control system 1130 may allow control of various systems on-board the vehicle. As shown in FIG. 11, control system 1130 may comprise one or more electronic control units (ECUs), each of which are dedicated to a specific set of functions. Each ECU may be a computer system (as described further in FIG. 13A), and each ECU may include functionality provided by one or more of the example ECUs described below.

Features of embodiments as described herein may be controlled by one or more ECUs that provide functionality to control access to the vehicle. A Vehicle Access System (VAS) ECU may provide passive/active wireless sensors (e.g., Bluetooth) for authorizing access (i.e., locking or unlocking) to the vehicle. A Near-Field Communication (NFC) ECU may support an NFC reader embedded in the vehicle (e.g., in the driver-side exterior door handle or in the armrest of the interior, driver-side door panel) for user authentication.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 1150, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by a Body Control Module (BCM) ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking.

Features of embodiments as described herein may be controlled by one or more ECUs may provide functions of an automated driving system (ADS) and/or an advanced driver assistance system (ADAS) that may be allowed by a driver of the vehicle to provide one or more functions to support driving assistance and/or automation. An Autonomy Control Module (ACM) ECU may process data captured by cameras 1120 and/or sensors 1110. In some embodiments, the ACM ECU may provide artificial intelligence functionality to provide and/or refine functions to support driving assistance and/or automation. An Autonomous Safety Module (ASM) ECU may provide functions to support driving safety by monitoring sensors that support self-driving functions. A Driver Monitoring System (DMS) ECU may provide functionality to monitor and inform the control system about the driver's level of attention (e.g., while relying on driving assistance and/or automation functions). The DMS may process data captured by a camera positioned to monitor the driver's gaze. A Park Assist Module (PAM) ECU may provide functions to assist a driver during manual and/or automated parking operations. The PAM ECU may process data captured by cameras 1120 and/or sensors 1110 in order to determine appropriate control commands.

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, HVAC controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may allow interaction with other modules of control system 1130. In some embodiments, functions of the ACM and the XMM may be combined together into an Autonomous eXperience Module (AXM) ECU.

Vehicle 1100 may include one or more additional ECUs, such as, by way of example and not limitation: a Central Gateway Module (CGM) ECU, a Vehicle Dynamics Module (VDM) ECU, a Seat Control Module (SCM) ECU, a Door Control Module (DCM) ECU, a Rear Zone Control (RZC) ECU, a Driver Monitoring System (DMS) ECU, and/or a Winch Control Module (WCM) ECU. If vehicle 1100 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figure 12:
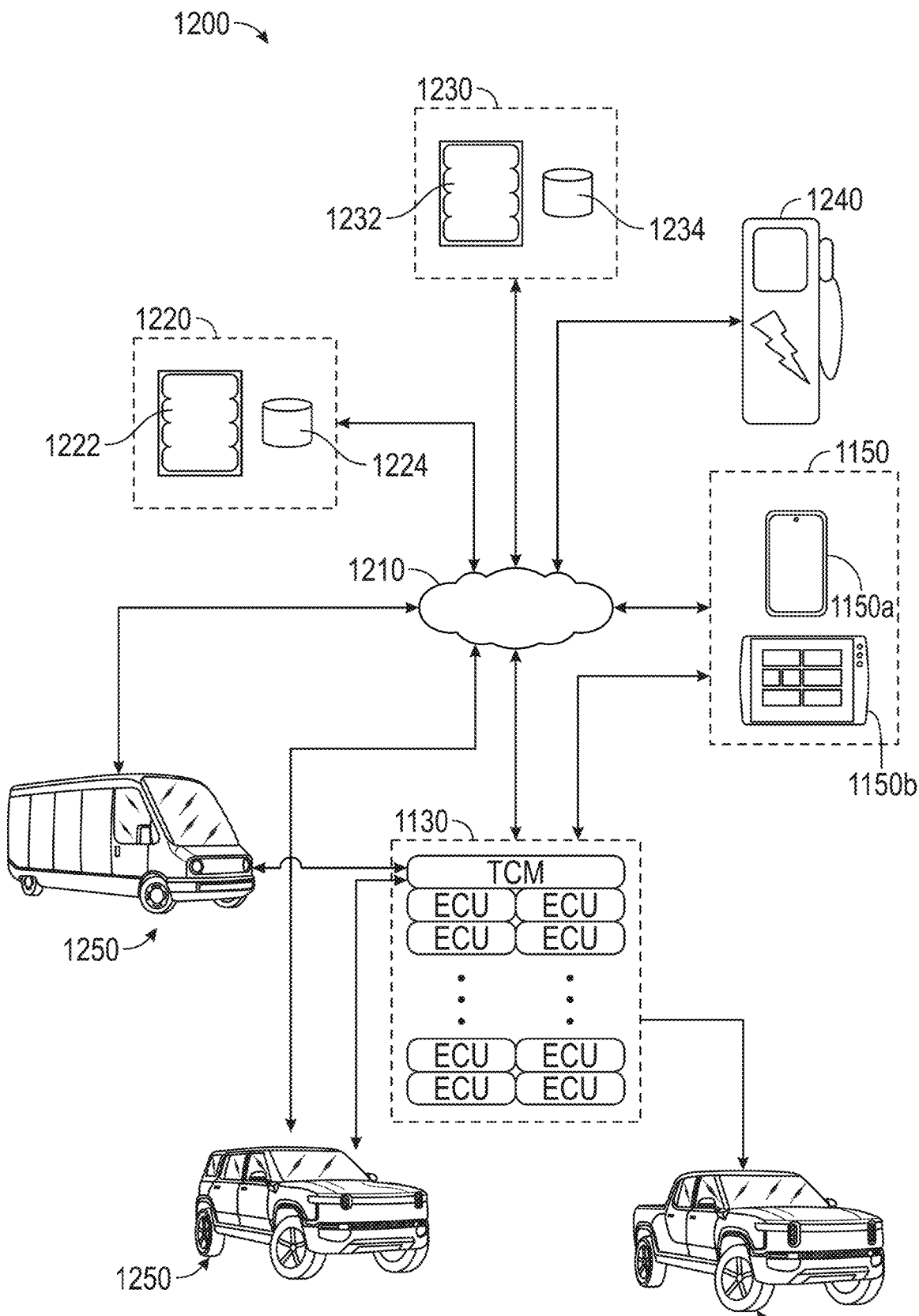
FIG. 12 illustrates an example network system including a connected vehicle.

FIG. 12 illustrates an example networked environment 1200. Computer system 1200 may include a connected vehicle 1100 with a control system 1130 that is capable of transmitting data to/from a network 1210. Network 1210 may also be connected to one or more computing servers 1220 (e.g., including compute units 1222 and storage units 1224) associated with a vehicle manufacturer, a vehicle service provider, a vehicle fleet operator, or a vehicle-charging facility provider. Network 1210 may also be connected to one or more third-party computing servers 1230 (e.g., including compute units 1232 and storage units 1234) associated with, for example, a smart accessory manufacturer, a group event organizer, service provider, or a governmental organization. Networked environment 1200 may include one or more landscape features 1240 (e.g., automated toll road sensors, smart road signs or road markers, automated toll gates, power dispensers at charging stations). Networked environment 1200 may also include other connected vehicles 1250 that may be capable of communicating with vehicle 1100 through network 1210 and/or directly with vehicle 1100 (e.g., by communicating with a TCM ECU of a control system 1130 of vehicle 1100 when connected vehicle 1250 is within range of a short-range communications network, such as Bluetooth). Networked environment 1200 may also include one or more computing devices 1150 (e.g., smartphone 1150a, a tablet computing device 1150b, or a smart vehicle accessory) capable of communicating with network 1210 and/or directly with vehicle 1100.

Networked environment 1200 may allow transmission of data and communications between any of the depicted elements. In some embodiments, such information may be communicated in only one direction (e.g., a smart road sign broadcasting information related to traffic control or delays due to construction); in other embodiments, information may include two-way communications (e.g., an automated toll gate that processes a request received from vehicle 1100 to deduct a toll from a specified account and provides confirmation of the transaction). In particular embodiments, one or more elements of networked environment 1200 may include one or more computer systems, as described in further detail with respect to FIG. 13A. In particular embodiments, one or more elements of networked environment 1200 perform one or more steps of one or more methods described or illustrated herein. In particular embodiments, software running on one or more elements of networked environment 1200 may be controlled by a single entity to perform one or more steps of one or more methods described or illustrated herein or provide functionality described or illustrated herein.

Figures 13A, 13B:
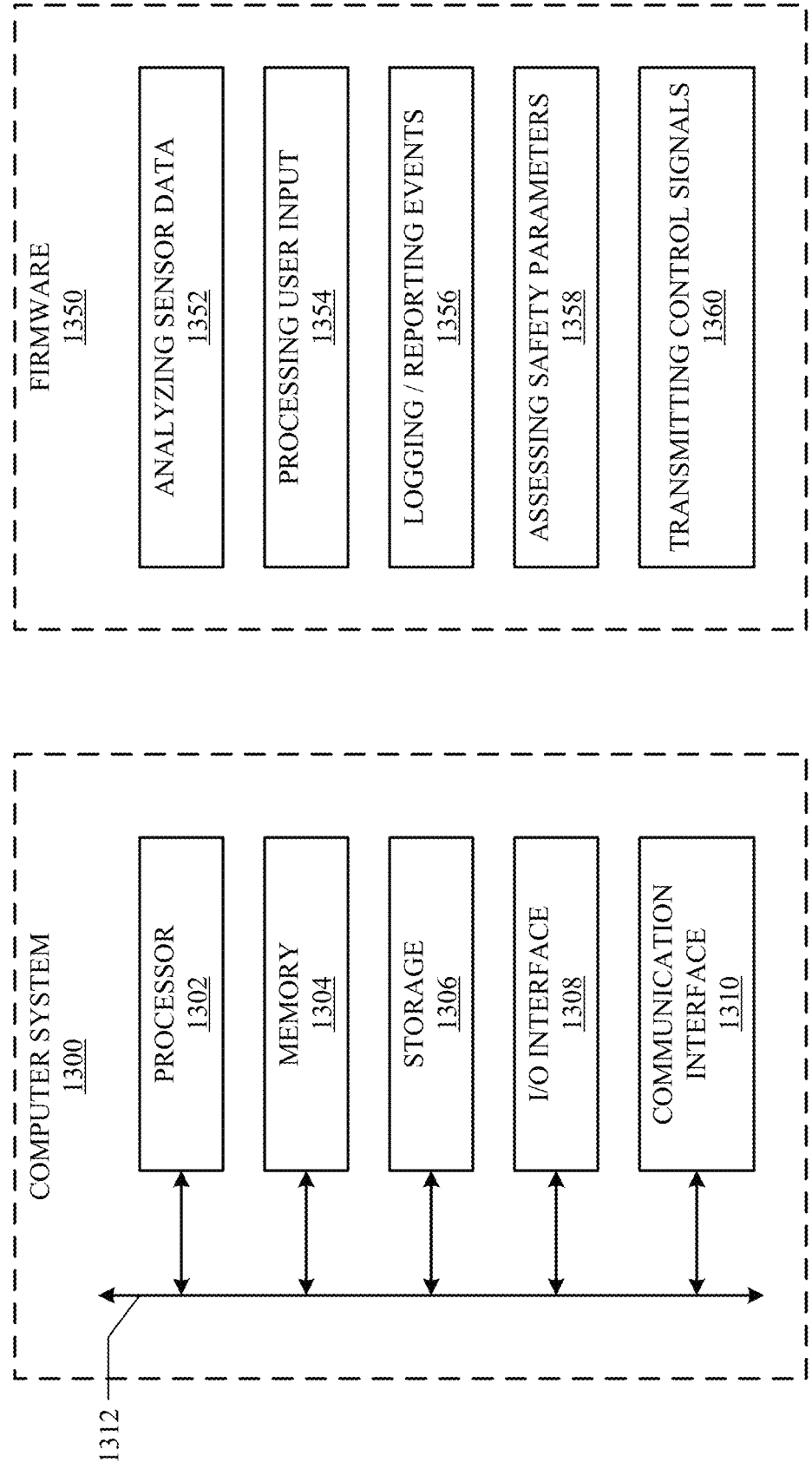
FIG. 13A is a schematic of an example computer system.
FIG. 13B illustrates example firmware for a vehicle ECU.

FIG. 13A illustrates an example computer system 1300. Computer system 1300 may include a processor 1302, memory 1304, storage 1306, an input/output (I/O) interface 1308, a communication interface 1310, and a bus 1312. Although this disclosure describes one example computer system including specified components in a particular arrangement, this disclosure contemplates any suitable computer system with any suitable number of any suitable components in any suitable arrangement. As an example and not by way of limitation, computer system 1300 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 1300 may include one or more computer systems 1300; be unitary or distributed, span multiple locations, machines, or data centers; or reside in a cloud, which may include one or more cloud components in one or more networks. Where appropriate, computer system(s) 1300 may perform, at different times or at different locations, in real time or in batch mode, one or more steps of one or more methods described or illustrated herein.

Processor 1302 (e.g., compute units 1222 and 1232) may include hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306 (e.g., storage units 1224 and 1234). Processor 1302 may include one or more internal caches for data, instructions, or addresses.

In particular embodiments, memory 1304 includes main memory for storing instructions for processor 1302 to execute or data for processor 1302 to operate on. In particular embodiments, one or more memory management units (MMUs) reside between processor 1302 and memory 1304 and facilitate accesses to memory 1304 requested by processor 1302. In particular embodiments, memory 1304 includes random access memory (RAM). This disclosure contemplates any suitable RAM.

In particular embodiments, storage 1306 includes mass storage for data or instructions. As an example and not by way of limitation, storage 1306 may include a removable disk drive, flash memory, an optical disc, a magneto-optical disc, magnetic tape, or a Universal Serial Bus (USB) drive or two or more of these. Storage 1306 may include removable or fixed media and may be internal or external to computer system 1300. Storage 1306 may include any suitable form of non-volatile, solid-state memory or read-only memory (ROM).

In particular embodiments, I/O interface 1308 includes hardware, software, or both, providing one or more interfaces for communication between computer system 1300 and one or more input and/or output (I/O) devices. Computer system 1300 may be communicably connected to one or more of these I/O devices, which may be incorporated into, plugged into, paired with, or otherwise communicably connected to vehicle 1100 (e.g., through the TCM ECU). An input device may include any suitable device for converting volitional user input into digital signals that may be processed by computer system 1300, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 1110 described above. An output device may include devices designed to receive digital signals from computer system 1300 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 1308 for them. I/O interface 1308 may include one or more I/O interfaces 1308, where appropriate.

In particular embodiments, communication interface 1310 includes hardware, software, or both providing one or more interfaces for data communication between computer system 1300 and one or more other computer systems 1300 or one or more networks. Communication interface 1310 may include one or more interfaces to a controller area network (MAY) or to a local interconnect network (LIN). Communication interface 1310 may include one or more of a serial peripheral interface (SPI) or an isolated serial peripheral interface (isoSPI). In some embodiments, communication interface 1310 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 1312 includes hardware, software, or both coupling components of computer system 1300 to each other. Bus 1312 may include any suitable bus, as well as one or more buses 1312, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 13B illustrates example firmware 1350 for a vehicle ECU 1300 as described with respect to control system 1130. Firmware 1350 may include functions 1352 for analyzing sensor data based on signals received from sensors 1110 or cameras 1120 received through communication interface 1310. Firmware 1350 may include functions 1354 for processing user input (e.g., directly provided by a driver of or passenger in vehicle 1100, or provided through a computing device 1150) received through I/O interface 1308. Firmware 1350 may include functions 1356 for logging detected events (which may be stored in storage 1306 or uploaded to the cloud), as well as functions for reporting detected events (e.g., to a driver or passenger of the vehicle through an instrument display or interactive interface of the vehicle, or to a vehicle manufacturer, service provider, or third party through communication interface 1310). Firmware 1350 may include functions 1358 for assessing safety parameters (e.g., monitoring the temperature of a vehicle battery or the distance between vehicle 1100 and nearby vehicles). Firmware 1350 may include functions 1360 for transmitting control signals to components of vehicle 1100, including other vehicle ECUs 1300.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, allowed to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising, by a server computing device:
   receiving, at the server computing device from a first device associated with a first user, a request to charge a first electric vehicle (EV) at a charging station, the charging station comprising one or more power dispensers and associated charging connectors for delivering power to EVs, wherein the first user is associated with the first EV;
   identifying, by the server computing device based on an assessment, by the server computing device, of one or more EVs that are connected to the one or more power dispensers at the charging station at the time the request is received, a target EV from among the one or more EVs that are connected to the one or more power dispensers for which to request disconnection of a target power dispenser connected to the target EV;
   facilitating communication with a second device associated with a second user, wherein the second user is associated with the target EV, and wherein the communication includes transmission of a notification comprising a request to disconnect the power dispenser connected to the target EV; and
   based on a response received at the server computing device from the second device indicating acceptance of the request to disconnect the power dispenser:
      transmitting a first signal from the server computing device to the charging station that causes the target power dispenser to stop charging the target EV, and
      transmitting a second signal from the server computing device to the target EV that causes the target EV to unlock a charge port of the target EV so that the charging connector associated with the target power dispenser connected to the target EV may be disconnected from the target EV.

2. The method of claim 1, further comprising:
   upon receiving the response accepting the request, transmitting an access key to the first device, wherein the access key causes the target EV to unlock the charge port when the first device is within a threshold distance from the target EV.

3. The method of claim 1, further comprising:
   upon receiving the response accepting the request, transmitting a notification to the first device comprising an indication that the request has been accepted, an indication identifying the target power dispenser, and information on whether the target EV will need to be disconnected from the target power dispenser.

4. The method of claim 1, further comprising:
   upon receiving the response accepting the request, transmitting a third signal to autonomously disconnect the target power dispenser connected to the target EV.

5. The method of claim 4, further comprising transmitting a fourth signal to the target EV to autonomously relocate the target EV away from the target power dispenser.

6. The method of claim 1, further comprising:
   after receiving the response from the second device, adjusting a social rating associated with the second user based on the response.

7. The method of claim 6, wherein the social rating is adjusted by an amount based on a charge level of the target EV when the response was received from the second device.

8. The method of claim 1, wherein the notification transmitted to the second device further comprises information on a charge level of the first EV and a charge level of the target EV.

9. The method of claim 1, wherein the assessment of the one or more EVs is based on a charge level of each of the one or more EVs.

10. The method of claim 1, wherein the assessment of the one or more EVs is based on an intended destination of each of the one or more EVs.

11. The method of claim 1, wherein the assessment of the one or more EVs comprises a comparison of a second EV with a third EV, wherein the target EV is one of the second EV and the third EV.

12. The method of claim 1, further comprising:
   upon receiving the request to charge at the charging station from the first user and prior to facilitating communication with a second device, adding the first user to a queue, at the server computing device, of users that have submitted requests to charge respective EVs at the charging station.

13. The method of claim 12, wherein the queue comprises a ranked queue in which the users that have submitted requests and the first user are ranked based on at least a charge of the respective EVs.

14. The method of claim 1, further comprising facilitating a transaction to transfer an incentive fee between a first bank account associated with the first user and a second bank account associated with the second user.

15. The method of claim 14, wherein an amount for the incentive fee is determined using a machine learning model.

16. The method of claim 14, wherein an amount for the incentive fee is based on a charge level of the target EV.

17. The method of claim 1, further comprising:
upon receiving the request to charge at the charging station from the first device, determining that the first device is within a predetermined distance from the charging station.

18. The method of claim 1, wherein the charging station is selected from among a plurality of charging stations that are within a threshold distance from the first device.

19. A non-transitory computer-readable medium comprising instructions that, when executed by one or more processors of one or more computing devices, cause the one or more processors to:
receive, at a server from a first device associated with a first user, a request to charge a first electric vehicle (EV) at a charging station, the charging station comprising one or more power dispensers and associated charging connectors for delivering power to EVs, wherein the first user is associated with the first EV;
identify, by the server based on an assessment by the server of one or more EVs that are connected to the one or more power dispensers at the charging station at the time the request is received, a target EV from among the one or more EVs that are connected to the one or more power dispensers for which to request disconnection of a target power dispenser connected to the target EV;
facilitate communication with a second device associated with a second user, wherein the second user is associated with the target EV, and wherein the communication includes transmission of a notification comprising a request to disconnect the power dispenser connected to the target EV; and
based on a response received at the server from the second device indicating acceptance of the request to disconnect the power dispenser:
transmit a first signal from the server to the charging station that causes the target power dispenser to stop charging the target EV, and
transmit a second signal from the server to the target EV that causes the target EV to unlock a charge port of the target EV so that the charging connector associated with the target power dispenser connected to the target EV may be disconnected from the target EV.

20. A system including one or more computing devices, comprising:
one or more non-transitory computer-readable storage media including instructions; and
one or more processors coupled to the one or more non-transitory storage computer-readable media, the one or more processors configured to execute the instructions to:
receive, at a server from a first device associated with a first user, a request to charge a first electric vehicle (EV) at a charging station, the charging station comprising one or more power dispensers and associated charging connectors for delivering power to EVs, wherein the first user is associated with the first EV;
identify, by the server based on an assessment by the server of one or more EVs that are connected to the one or more power dispensers at the charging station at the time the request is received, a target EV from among the one or more EVs that are connected to the one or more power dispensers for which to request disconnection of a target power dispenser connected to the target EV;
facilitate communication with a second device associated with a second user, wherein the second user is associated with the target EV, and wherein the communication includes transmission of a notification comprising a request to disconnect the power dispenser connected to the target EV; and
based on a response received at the server from the second device indicating acceptance of the request to disconnect the power dispenser:
transmit a first signal from the server to the charging station that causes the target power dispenser to stop charging the target EV, and
transmit a second signal from the server to the target EV that causes the target EV to unlock a charge port of the target EV so that the charging connector associated with the target power dispenser connected to the target EV may be disconnected from the target EV.

* * * * *